(12) United States Patent
Fukushima

(10) Patent No.: US 10,367,894 B2
(45) Date of Patent: Jul. 30, 2019

(54) INFORMATION PROCESSING APPARATUS, METHOD FOR CONTROLLING THE SAME, NON-TRANSITORY COMPUTER-READABLE STORAGE MEDIUM, AND INFORMATION PROCESSING SYSTEM

(71) Applicant: CANON KABUSHIKI KAISHA, Tokyo (JP)

(72) Inventor: Kenta Fukushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 15/858,135

(22) Filed: Dec. 29, 2017

(65) Prior Publication Data

US 2018/0198870 A1 Jul. 12, 2018

(30) Foreign Application Priority Data

Jan. 11, 2017 (JP) .................................. 2017-002843

(51) Int. Cl.
*G06F 15/16* (2006.01)
*H04L 29/08* (2006.01)
*H04N 1/333* (2006.01)
*H04L 29/06* (2006.01)
*H04L 29/12* (2006.01)

(52) U.S. Cl.
CPC ........ *H04L 67/141* (2013.01); *H04L 63/0272* (2013.01); *H04L 67/28* (2013.01); *H04L 69/18* (2013.01); *H04L 69/329* (2013.01); *H04N 1/33346* (2013.01); *H04L 61/2007* (2013.01); *H04L 63/02* (2013.01); *H04L 67/02* (2013.01); *H04L 67/42* (2013.01); *H04N 2201/0094* (2013.01); *H04N 2201/33392* (2013.01)

(58) Field of Classification Search
CPC ....... H04N 2201/0094; H04N 5/23206; H04N 1/00244; H04N 21/4223; H04N 7/181; H04N 1/00344; H04N 21/2743; H04N 7/152; H04N 21/2187; G06F 3/1204; G06F 3/1238

See application file for complete search history.

(56) References Cited

U.S. PATENT DOCUMENTS 8,976,402 B2 3/2015 Nakamura

FOREIGN PATENT DOCUMENTS

JP 2008270972 A 11/2008
JP 2015032224 A 2/2015

*Primary Examiner* — Michael A Keller
*Assistant Examiner* — Thao D Duong
(74) *Attorney, Agent, or Firm* — Rossi, Kimms & McDowell LLP

(57) ABSTRACT

This invention provides, for each apparatus, one communication control unit that generically controls communication between a relay server and a communication client or a communication server in each apparatus. More specifically, each communication control unit creates a communication socket that designates a predetermined port and an IP address indicating a local apparatus, and exchanges data between the communication server and the communication client via the communication socket, adjusting and relaying communication data between HTTP and the communication protocol of each of the communication server and the communication client.

14 Claims, 15 Drawing Sheets

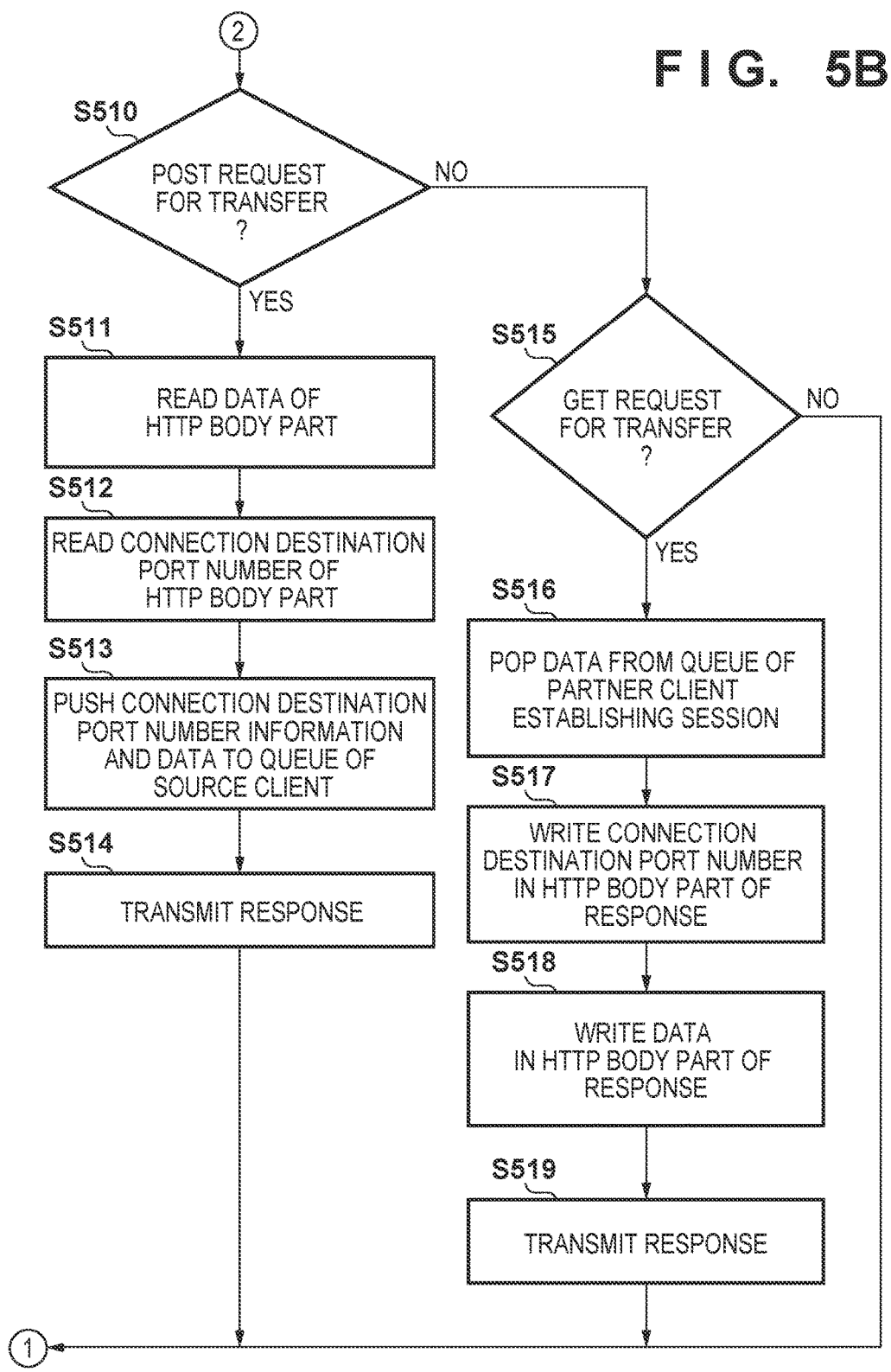

ately tell a user an error solution method and solve an error without personnel for maintenance heading out to the site upon occurrence of the error in the multifunction peripheral. This makes it possible to shorten a time until the solution of the error. In such a remote support service, it is effective for the user to implement connection with the call center by using the communication function of the multifunction peripheral without using an apparatus other than the multifunction peripheral such as a telephone or a PC.

INFORMATION PROCESSING APPARATUS, METHOD FOR CONTROLLING THE SAME, NON-TRANSITORY COMPUTER-READABLE STORAGE MEDIUM, AND INFORMATION PROCESSING SYSTEM

BACKGROUND OF THE INVENTION

Field of the Invention

The present invention relates to an information processing apparatus, a method for controlling the same, a non-transitory computer-readable storage medium, and an information processing system.

Description of the Related Art

A remote support service that uses voice, moving image communication, and a remote operation is currently proposed in a multifunction peripheral. The remote support service allows a call center to directly tell a user an error solution method and solve an error without personnel for maintenance heading out to the site upon occurrence of the error in the multifunction peripheral. This makes it possible to shorten a time until the solution of the error. In such a remote support service, it is effective for the user to implement connection with the call center by using the communication function of the multifunction peripheral without using an apparatus other than the multifunction peripheral such as a telephone or a PC.

In general, however, it is often difficult for the multifunction peripheral and the PC of the call center to establish a session directly because of a firewall installed in an office. Therefore, a technique of using HTTP having high compatibility with the firewall to establish a session between information terminals is proposed. Connection from the Internet side to an information terminal blocked by the firewall is generally restricted. On the other hand, connection to the Internet from the side of an information terminal in the firewall is generally permitted as long as HTTP having high compatibility with the firewall is used.

Japanese Patent Laid-Open No. 2015-32224 proposes a technique of causing two information terminals blocked by a firewall to be connected to a session management server connectable as an HTTP client from the side of each information terminal, thereby implementing the establishment of a session between the information terminals. In addition, VNC (Virtual Network Computing) serving as a remote operation protocol is communicated between the two information terminals blocked by the firewall via an HTTP protocol. In such a system, in general, a technique of performing a remote operation not only on VNC but also on a server function of the WEB server, an SSH (SECURE SHELL) server, and the like of the multifunction peripheral is further proposed.

The above related art, however, poses the following problem. For example, the above related art need to have a function of converting communication contents so as to match HTTP for each communication function of performing a remote operation such as VNC communication, WEB communication, or SSH communication. That is, in a current system, an application or the like need to be developed for each communication function, resulting in an increase in development cost.

SUMMARY OF THE INVENTION

The present invention enables realization of a mechanism for performing communication by a general-purpose conversion function without the need of a conversion function to HTTP for each communication function between two apparatuses blocked by a firewall.

One aspect of the present invention provides an information processing system that performs communication between an image forming apparatus and an information processing apparatus via a relay server, the information processing apparatus comprising: a plurality of communication clients respectively capable of communicating by different communication protocols; and a first communication control unit that sets a local host as a connection destination, creates a first communication socket by designating a predetermined port, activates one communication client out of the plurality of communication clients, and in communication between the activated communication client and the relay server, adjusts and relays communication data between HTTP and the corresponding communication protocol via the first communication socket, wherein at least one of the plurality of communication clients and the first communication control unit is implemented by at least one processor and a memory, and the image forming apparatus comprising: a plurality of communication servers respectively capable of communicating by different communication protocols; and a second communication control unit that sets a local host as a connection destination, creates a second communication socket to one communication server out of the plurality of communication servers by designating a predetermined port designated from the information processing apparatus, and in communication between the communication server and the relay server, adjusts and relays communication data between HTTP and the corresponding communication protocol via the second, communication socket, wherein at least one the plurality of communication servers and the second communication control unit is implemented by at least one processor and a memory.

Another aspect of the present invention provides an information processing system that performs communication between an image forming apparatus and an information processing apparatus via a relay server, the information processing apparatus comprising: a plurality of communication clients respectively capable of communicating by different communication protocols; and a first communication control unit that sets a local host as a proxy server, creates a first communication socket by designating a predetermined port, activates one communication client out of the plurality of communication clients, and in communication between the activated communication client and the relay server, adjusts and relays communication data between HTTP and the corresponding communication protocol via the first communication socket, wherein at least one of the plurality of communication clients and the first communication control unit is implemented by at least one processor and a memory, and the image forming apparatus comprising: a plurality of communication servers respectively capable of communicating by different communication protocols; and a second communication control unit that sets a local host as a proxy server, creates a second communication socket to one communication server out of the plurality of communication servers by designating a predetermined port designated from the information processing apparatus, and in communication between the communication server and the relay server, adjusts and relays communication data between HTTP and the corresponding communication protocol via the second communication socket, wherein at least one the plurality of communication servers and the second communication control unit is implemented by at least one processor and a memory.

Still another aspect of the present invention provides an information processing apparatus that communicates with an external apparatus via a relay server, the apparatus comprising: a plurality of communication clients respectively capable of communicating by different communication protocols; and a communication control unit that sets a local host as one of a connection destination and a proxy server, creates a communication socket by designating a predetermined port, activates one communication client out of the plurality of communication clients, and in communication between the activated communication client and the relay server, adjusts and relays communication data, between HTTP and the corresponding communication protocol via the communication socket, wherein at least one of the plurality of communication clients and the communication control unit is implemented by at least one processor and a memory.

Yet still another aspect of the present invention provides an information processing apparatus that communicates with an external apparatus via a relay server, the apparatus comprising: a plurality of communication servers respectively capable of communicating by different communication protocols; and a communication control unit that sets a local host; as one of a connection destination and a proxy server, creates a communication socket to one communication server out of the plurality of communications servers by designating a predetermined port designated by the external apparatus, and in communication between the communication server and the relay server, adjusts and relays communication data between HTTP and the corresponding communication protocol via the communication socket, wherein at least one the plurality of communication servers and the communication control unit is implemented by at least one processor and a memory.

Still yet another aspect of the present invention provides a method for controlling an information processing apparatus that includes a plurality of communication clients respectively capable of communicating by different communication protocols and communicates with an external apparatus via a relay server, the method comprising: setting a local host as one of a connection destination and a proxy server, and creating a communication socket by designating a predetermined port; activating one communication client out of the plurality of communication clients; and adjusting and relaying communication data between HTTP and the corresponding communication protocol via the communication socket in communication between the activated communication client and the relay server.

Yet still another aspect of the present invention provides a method for controlling an information processing apparatus that includes a plurality of communication servers respectively capable of communicating by different communication protocols and communicates with an external apparatus via a relay server, the method comprising: setting a local host as one of a connection destination and a proxy server, and creating a communication socket to one communication server out of the plurality of communications servers by designating a predetermined port designated by the external apparatus; and adjusting and relaying communication data between HTTP and the corresponding communication protocol via the communication socket in communication between the communication server and the relay server.

Still yet another aspect of the present invention provides a non-transitory computer-readable storage medium storing a computer program for causing a computer to execute each step of a method for controlling an information processing apparatus that includes a plurality of communication clients respectively capable of communicating by different communication protocols and communicates with an external apparatus via a relay server, the method executing: setting a local host as one of a connection destination and a proxy server, and creating a communication socket by designating a predetermined port; activating one communication client out of the plurality of communication clients; and adjusting and relaying communication data between HTTP and the corresponding communication protocol via the communication socket in communication between the activated communication client and the relay server.

Yet still another aspect of the present invention provides a non-transitory computer-readable storage medium storing a computer program for causing a computer to execute each step of a method for controlling an information processing apparatus that includes a plurality of communication servers respectively capable of communicating by different communication protocols and communicates with an external apparatus via a relay server, the method executing: setting a local host as one of a connection destination and a proxy server, and creating a communication socket to one communication server out of the plurality of communications servers by designating a predetermined port designated by the external apparatus; and adjusting and relaying communication data between HTTP and the corresponding communication protocol via the communication socket in communication between the communication server and the relay server.

Further features of the present invention will be apparent from the following description of exemplary embodiments with reference to the attached drawings.

BRIEF DESCRIPTION OF THE DRAWINGS

FIGS. 5A and 5B are a flowchart showing the process of a relay server according to the embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Network Arrangement>

The first embodiment of the present invention will be described below. First, the network arrangement of an information processing system that performs remote support according to this embodiment will be described with reference to FIG. 1.

In this system, an image forming apparatus 101, an operator PC 102 serving as an information processing apparatus, and an HTTP relay server 103 are arranged to be communicable with each other. The image forming apparatus 101 and the operator PC 102 serve as the apparatuses to which the present invention is applied and operate as partner apparatuses. The image forming apparatus 101 and the operator PC 102 have data communication functions of executing call control by HTTP (HyperText Transfer Protocol) to perform data communication.

Figure 1:
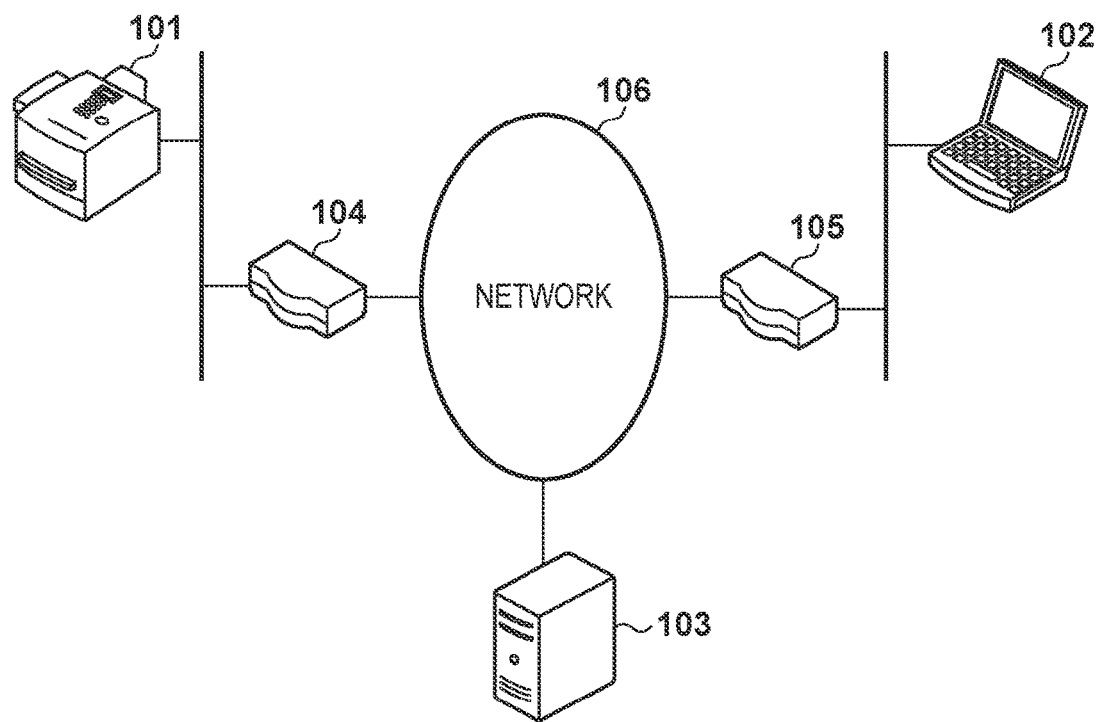
FIG. 1 is a view showing a network arrangement according to an embodiment.

As shown in FIG. 1, the image forming apparatus 101 is connected to a network 106 via a firewall (FW) 104. The operator PC 102 on the call center side is connected to the network 106 via an FW 105. In addition, the HTTP relay server 103 is connected to the network 106. In HTTP data communication, client nodes perform data communication by sending POST/GET requests to an URI (Uniform Resource Identifier) provided by the HTTP relay server 103. This makes it possible to allow the client nodes to perform data communication even, if a communication path is blocked by the private address area and the FW.

According to this embodiment, the image forming apparatus 101 and the operator PC 102 operate as HTTP client nodes. In this embodiment, an arrangement in which the client nodes communicate with each other via the FW with respect to the network 106 is exemplified. The present invention is not limited to this. A network arrangement without being through the FW may be applied. In addition, many FWs, image forming apparatuses, and operator PCs larger in number than the illustrated ones may be connected to the network 106. Furthermore, in this embodiment, a protocol other than HTTP may be used as a communication protocol.

<Hardware Arrangement>

Figure 2A:
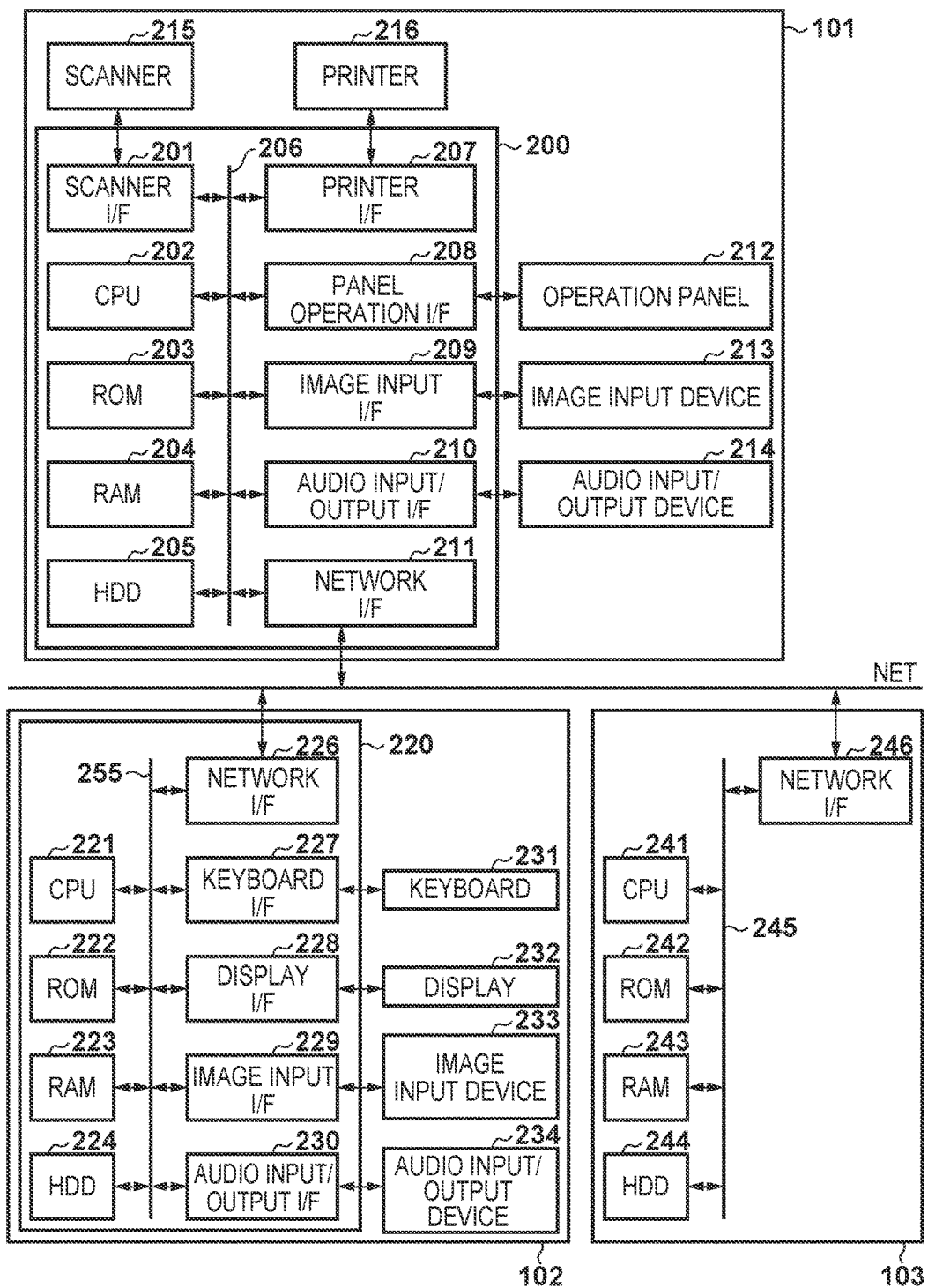
FIG. 2A is a block diagram showing the hardware arrangement of an information processing system according to the embodiment.

The hardware arrangement of the information processing system according to this embodiment will be described next with reference to FIG. 2A. The image forming apparatus 101 includes a system control unit 200, an operation panel 212, an image input device 213, an audio input/output device 214, a scanner 215, and a printer 216. The system control unit 200 includes a scanner I/F 201, a CPU 202, a ROM 203, a RAM 204, an HDD 205, a printer I/F 207, a panel operation I/F 208, an image input I/F 209, an audio input/output I/F 210, and a network I/F 211. The above devices can exchange data via a system bus 206.

The CPU 202 systematically controls access to the various kinds of devices connected to the system bus 206 based on control programs stored in the ROM 203 or the hard disk (HDD) 205. The ROM 203 stores control programs executable by the CPU 202. The RAM 204 mainly functions as a main memory, a work area, and the like of the CPU 202 and can extend the memory capacity by an optional RAM connected to an expansion port (not shown). The hard disk (HDD) 205 stores a boot program, various kinds of applications, font data, user files, editing files, and the like. Note that in this embodiment, the HDD 205 is used, but an SD card or flash memory other than the HDD 205 may be used as an external storage device.

The scanner I/F 201 controls image input from the scanner 215. The printer I/F 207 controls image output to the printer 216. The panel operation I/F 208 performs display control of the operation panel 212 and controls input of various kinds of setting information set in the operation panel 212. The image input I/F 209 controls image input from the image input device 213 such as a camera. The audio input/output I/F 210 controls audio input/output with respect to the audio input/output device 214 such as a headset. The network I/F 211 performs data communication with an external network via a network cable.

The operator PC 102 includes a control unit 220, a keyboard 231, a display 232, an image input device 233, and an audio input/output device 234. The control unit 220 includes a CPU 221, a ROM 222, a RAM 223, an HDD 224, a network I/F 226, a keyboard I/F 227, a display I/F 228, an image input I/F 229, and an audio input/output I/F 230.

The CPU 221 systematically controls access to the various kinds of devices connected, to a system bus 225 based on control programs stored in the ROM 222 or the hard disk (HDD) 224. The ROM 222 stores control programs executable by the CPU 221. The RAM 223 mainly functions as a main memory, a work area, and the like of the CPU 221 and can extend the memory capacity by an optional RAM connected to an expansion port (not shown). The hard disk (HDD) 224 stores a boot program, various kinds of applications, font data, user files, editing files, and the like. Note that in this embodiment, the HDD 224 is used, but an SD card or flash memory other than the HDD 224 may be used as an external storage device.

The network I/F 226 performs data communication with an external network via a network cable. The keyboard I/F 227 controls key input from the keyboard 231 or a pointing device (not shown). The display I/F 228 controls display of the display 232. The image input I/F 229 controls image input from the image input device 233 such as a camera. The audio input/output I/F 230 controls audio input/output with respect to the audio input/output device 234 such as a headset.

The HTTP relay server 103 includes a CPU 241, a ROM 242, a RAM 243, an HDD 244, and a network I/F 246. The CPU 241 systematically controls access to the various kinds of devices connected to a system bus 245 based on control programs stored in the ROM 242 or the hard disk (HDD) 244. The ROM 242 stores control programs executable by the CPU 241, The RAM 243 mainly functions as a main memory, a work area, and the like of the CPU 241 and can extend the memory capacity by an optional RAM connected to an expansion port (not shown). The hard disk (HDD) 244 stores a boot program, various kinds of applications, font data, user files, editing files, and the like. Note that in this embodiment, the HDD 244 is used, but an SD card or flash memory other than the HDD 244 may be used as an external storage device. The network I/F 246 performs data communication with an external network via a network cable.

<Software Arrangement>

Figure 2B:
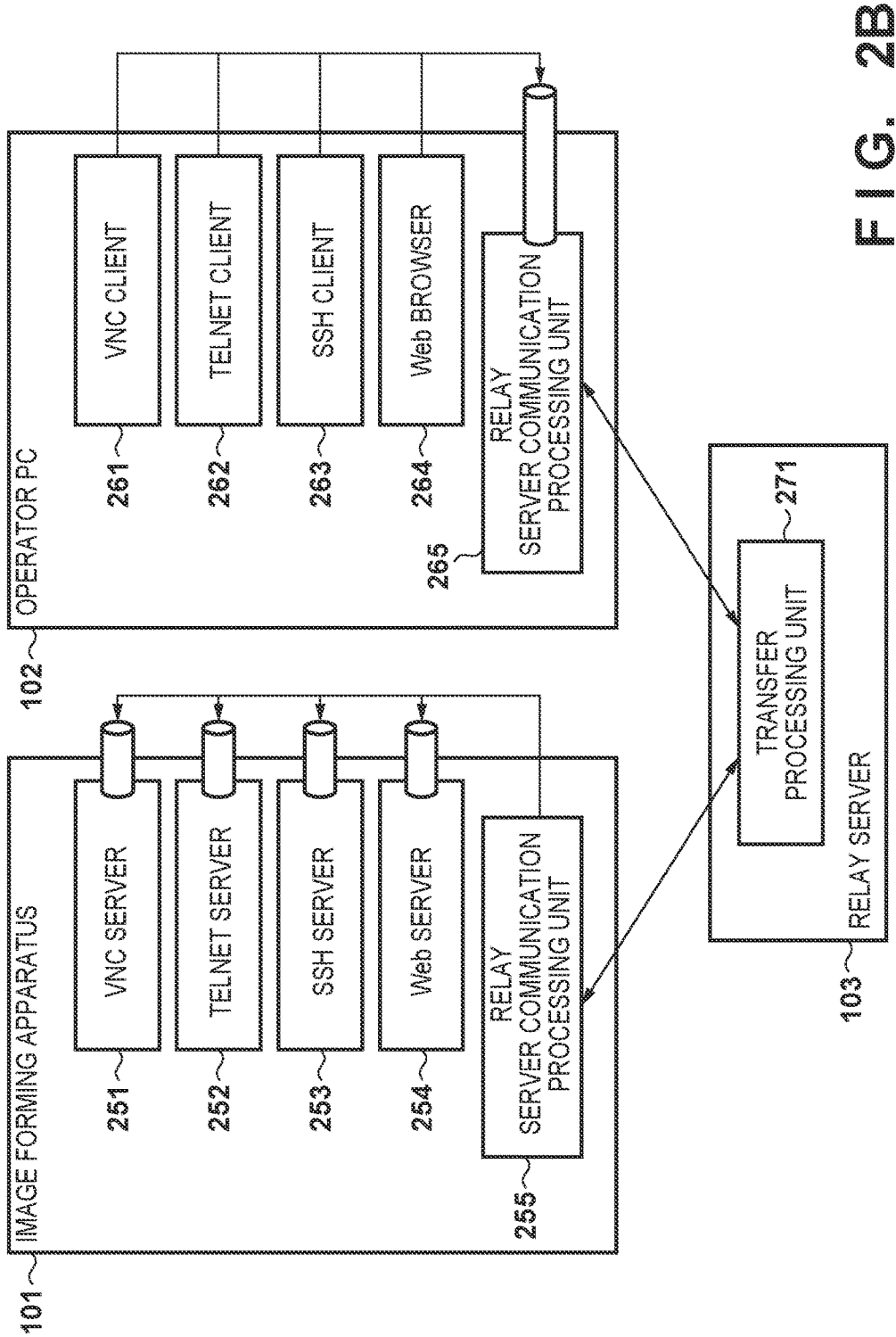
FIG. 2B is a block diagram showing the software arrangement of the information processing system according to the embodiment.

The software arrangement of the information processing system according to this embodiment will be described next with reference to FIG. 2B, The image forming apparatus 101 includes a relay server communication processing unit 255 and a server unit of a VNC server 251, a TELNET (TELE-TYPE NETWORK) server 252, an SSH (SECURE SHELL) server 253, a Web server 254, and the like. The relay server communication processing unit 255 controls communication processing with the relay server 103. The server unit is not software used only in the information processing system but software provided as a general function of the image forming apparatus 101. The relay server communication processing unit 255 functions as the second communication control unit, and generically adjusts the communication protocols of the communication servers 251 to 254 and HTTP used to communicate with the relay server 103.

On the other hand, the operator PC 102 includes a relay server communication processing unit 265 and a client unit of a VNC client 261, a TELNET client 262, an SSH client 263, a Web browser 264, and the like. The relay server communication processing unit 265 functions as the first communication control unit and controls communication processing with the relay server 103. The client unit is not software used only in the information processing system but software provided so as to be generally used in the operator PC 102. The relay server communication processing unit 265 generically adjusts the communication protocols of the communication clients 261 to 264 and HTTP used to communicate with the relay server 103.

The relay server 103 includes a transfer processing unit 271 that transfers communication of the image forming apparatus 101 and the operator PC 102. The relay server communication processing unit 255 executes a process of encapsulating communication data, accepted from the servers of the server unit with HTTP so as to allow the servers to communicate with the relay server 103 by using HTTP. For example, the relay server communication processing unit 255 embeds VNC data output from the VNC server 251 in HTTP data and transmits it to the relay server 103. The same also applied to the other servers. In addition, the relay server communication processing unit 255 executes a process of extracting data corresponding to the communication protocol of each server from the HTTP data received from the relay server 103 and transferring it to the server.

In this embodiment, a description will be given in a form in which the operator PC 102 includes the communication clients, and the image forming apparatus 101 includes the communication servers. The present invention is not limited to this. For example, a form may be possible in which access is requested from the image forming apparatus 101 to the operator PC 102 in a form in which the image forming apparatus 101 includes the communication clients, and the operator PC 102 includes the communication servers. Note that in FIG. 2B, this indicates HTTP tunneling in a mode when the transmission of communication data is implemented by accessing from the operator PC 102 to the image forming apparatus 101 conceptually in a columnar shape. This is an example of the present invention. For example, when the communication data is transmitted by accessing from the image forming apparatus 101 to the operator PC 102, columnar portions shown in FIG. 2B are reversed between the image forming apparatus 101 and the operator PC 102.

<Overall Processing>

The sequence of an overall operation in the information processing system according to this embodiment will be described next. First, each of the operator PC 102 and the image forming apparatus 101 accesses the relay server 103. The relay server 103 pairs two clients, and the two clients are set in a session established state. In order to set the session established state, for example, there is a method for paring the operator PC 102 and the image forming apparatus 101 by the relay server 103 by inputting the same number or a character string to them. However, this is not related to the present invention, and thus a detailed description thereof will be omitted.

After the session established state is set, an operator operates the start of VNC (Virtual Network Computing) from the operator PC 102, performing a remote operation. In this embodiment, an example in which a communication protocol corresponding to VNC is used will be described as an example of the remote operation. However, communication protocols such as TELNET (TELETYPE NETWORK) and SSH (SECURE SHELL) are also applicable. More detailed processes of the image forming apparatus 101, operator PC 102, and relay server 103 will be described below.

<Processing Sequence of Operator PC>

Figure 3:
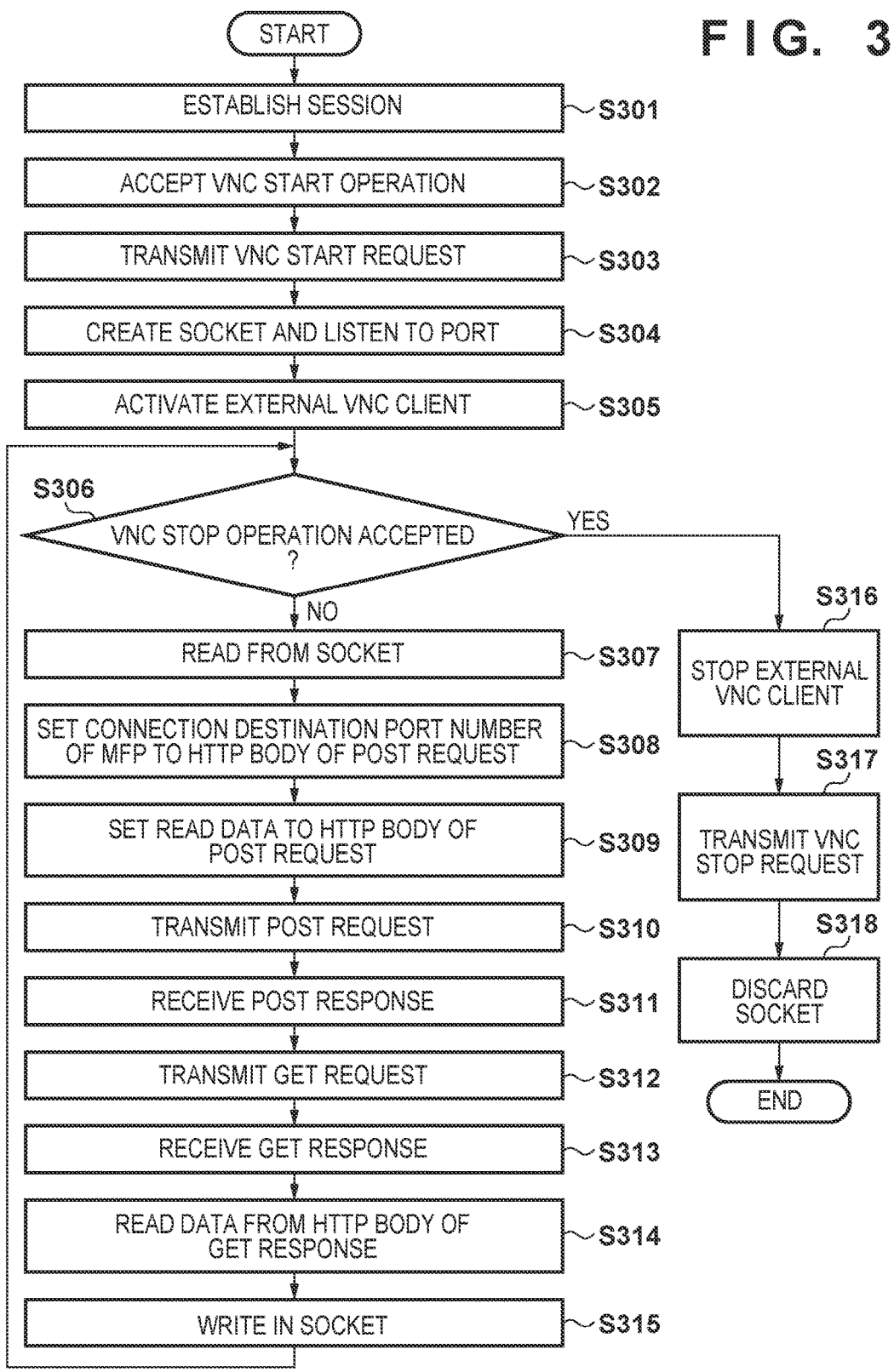
FIG. 3 is a flowchart showing the process of an operator PC according to the embodiment.

The processing sequence of the operator PC 102 according to this embodiment will be described next with reference to FIG. 3. This flowchart is implemented by loading the programs stored in, for example, the HDD 224 into the RAM 223 and executed by the CPU 221. The processing to be described below is performed by the relay server communication processing unit 265 of the operator PC 102 shown in FIG. 2B.

When this processing is started, first, in step S301, the relay server communication processing unit 265 of the operator PC 102 accesses the relay server 103 and establishes a session with the image forming apparatus 101 that performs remote maintenance. As described above, a description of a detailed establishment method will be omitted. Subsequently, in step S302, the relay server communication processing unit 265 accepts a VNC start operation from a user via a user interface such as the keyboard 231. For example, the relay server communication processing unit 265 displays a start button on the screen of the operator PC 102 and accepts a click operation with a mouse pointer.

Upon accepting the VNC start operation, in step S303, the relay server communication processing unit 265 transmits a VNC start request to the relay server 103. More specifically, the relay server communication processing unit 265 writes data "application name: VNC" and "command: start" in an HTTP body part, and posts a request to the relay server 103. Subsequently, in step S304, the relay server communication processing unit 265 creates a socket and starts to listen (listening state) in a specific port. The listening state is a state in which data received from a predetermined port is waited. This port is a port to be a connection destination of an external VNC client application, for example, the VNC client 261, and may be defined in advance or may dynamically use a free port. In this embodiment, a description will be given assuming that a port number is 10000. After the relay server communication processing unit 265 starts to listen in the port, in step S305, it activates a VNC client application. At this time, the relay server communication processing unit 265 sets an IP address to "127.0.0.1" as the connection destination of the VNC client application and designates a port number as "10000" listened in step S304, activating the application. That is, the relay server communication processing unit 265 sets a local loopback address indicating a local apparatus as the IP address.

When the VNC client application is activated, in step S306, the relay server communication processing unit 265 determines whether a VNC stop operation is accepted. If the VNC stop operation is accepted, the process advances to end processing. If the VNC stop operation is not accepted, the process advances to step S307 in which the relay server communication processing unit 265 first reads data from a socket (communication socket). In step S307, the relay server communication processing unit 265 can receive data transmitted from the VNC client application. Upon receiving the data, in step S308, the relay server communication processing unit 265 creates an HTTP POST request to be transmitted to the relay server 103 and designates a port number to be connected to the VNC server 251 of the image forming apparatus (MFP) 101 to the HTTP body part. This port number is desirably designated and held by the operator PC 102 in advance. In this embodiment, a description will be given assuming that this port number is 5900. More specifically, "Port=5900" is described in the HTTP body part.

Then, in step S309, the relay server communication processing unit 265 sets the data read in step S307 to the HTTP body part. More specifically, "Data=XXX (read binary data)" is described. When the HTTP POST request is completed in steps S308 and S309, the relay server communication processing unit 265 transmits the HTTP POST request to the relay server 103 in step S310 and receives a POST response in step S311.

Then, the relay server communication processing unit 265 transmits an HTTP GET request to the relay server 103 in step S312 and receives a GET response in step S313. Upon completion a reception, in step S314, the relay server communication processing unit 265 reads data from the HTTP body part of the GET response. More specifically, the relay server communication processing unit 265 reads a part following "Data=" of the HTTP body part. The data read in step S314 is data transmitted by the VNC server 251 of the image forming apparatus 101. Upon completing reading the data, in step S315, the relay server communication processing unit 265 writes the read data in the socket created in step S304.

The relay server communication processing unit 265 repeats processes from steps S307 to S315 until the VNC stop operation in step S306 is accepted. If the VNC stop operation is accepted in step S306, the process advances to step S316 in which the relay server communication processing unit 265 stops the VNC client application activated in step S305. Subsequently, in step S317, the relay server communication processing unit 265 transmits a VNC stop request to the relay server 103. More specifically, the relay server communication processing unit 265 writes data "application name: VNC" and "command: stop" in the HTTP body part, and posts a request to the relay server 103. Finally, in step S318, the relay server communication processing unit 265 discards the socket created in step S304 and terminates the process.

<Processing Sequence of Image Forming Apparatus>

Figure 4:
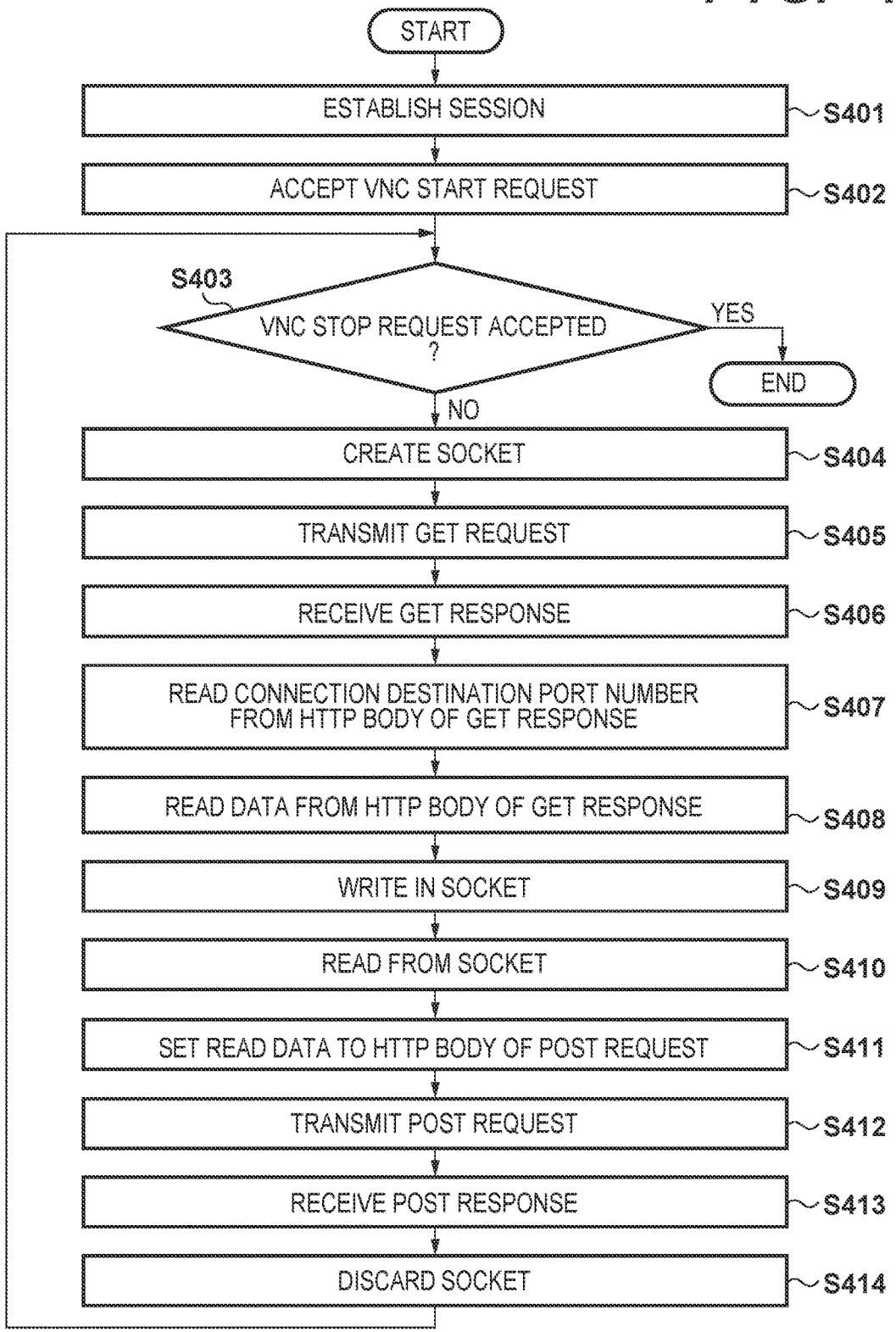
FIG. 4 is a flowchart showing the process of an image forming apparatus according to the embodiment.

The processing sequence of the image forming apparatus 101 according to this embodiment will be described next with reference to FIG. 4. This flowchart is implemented by loading the programs stored in, for example, the HDD 205 into the RAM 204 and executed by the CPU 202. The processing to be described below is performed in the relay server communication processing unit 255 of the image forming apparatus 101 shown in FIG. 2B.

When this processing is started, first, in step S401, the relay server communication processing unit 255 of the image forming apparatus 101 accesses the relay server 103 and establishes a session with the operator PC 102 that performs remote maintenance. As described above, a description of a detailed establishment method will be omitted. Subsequently, in step S402, the relay server communication processing unit 255 receives a VNC start request from the relay server 103. While the VNC start request is transmitted from the relay server 103, a trigger is the transmission of the POST request performed in step S303 in the operator PC 102. The relay server communication processing unit 255 periodically transmits an HTTP GET request to the relay server 103, receiving a VNC start request. More specifically, the relay server communication processing unit 255 detects the VNC start request by reading data "application name: VNC" and "command; start" from the HTTP body part of a GET response.

Upon accepting the VNC start request in step S402, the process advances to step S403 in which the relay server communication processing unit 255 determines whether a VNC stop request is accepted and terminates the process if the VNC stop request is accepted. The relay server communication processing unit 255 receives the VNC stop request by transmitting the HTTP GET request periodically in the same manner as the VNC start request. More specifically, the relay server communication processing unit 255 detects the VNC stop request by reading data "application name: VNC" and "command: stop" from the HTTP body part of the GET response.

If the VNC stop request is not accepted, the process advances to step S404 in which the relay server communication processing unit 255 first creates a socket to be connected to the VNC server 251 of the image forming apparatus 101 in accordance with a request accepted in step S402. A specific server to be connected by the socket is not set here. Upon completing creating the socket, the relay server communication processing unit 255 transmits the HTTP GET request to the relay server 103 in step S405 and receives a GET response in step S406. Upon completion of the reception, in step S407, the relay server communication processing unit 255 obtains the port number of a connection destination from the HTTP body part of the GET response. A value obtained here is a value (Port=5900) designated by the operator PC 102 in step S308. More specifically, the relay server communication processing unit 255 reads a part following "Port=" of the HTTP body part. Subsequently, in step S408, the relay server communication processing unit 255 reads data from the HTTP body part of the GET response. More specifically, the relay server communication processing unit 255 reads a part following "Data=" of the HTTP body part. The data read in step S408 is data transmitted by the VNC client application of the operator PC 102.

Upon completing reading the data, in step S409, the relay server communication processing unit 255 designates "127.0.0.1" to a connection destination host name and port number obtained in step S407 to a connection destination port number, connecting the socket. Furthermore, the relay server communication, processing unit 255 writes the data read in step S408 in the socket. That is, the relay server communication processing unit 255 sets a local host, for example, a local loopback address indicating a local apparatus to a connection destination here. Subsequently, in step S410, the relay server communication processing unit 255 reads data from the socket. In step S410, the relay server communication processing unit 255 can receive data transmitted from the VNC server 251.

Then, in step S411, the relay server communication processing unit 255 sets the data read in step S410 to the HTTP body part. More specifically, the relay server communication processing unit 255 describes "Data=XXX (read binary data)". Upon completion of an HTTP POST request in step S411, the relay server communication processing unit 255 transmits the HTTP POST request to the relay server 103 in step S412 and receives a POST response in step S413. Upon completion of all communication, in step S414, the relay server communication processing unit 255 discards the socket created in step S404. The processes in steps S403 to S414 are performed repeatedly until the VNC stop request is accepted in step S403.

<Processing Sequence of Relay Server>

Figure 5A:
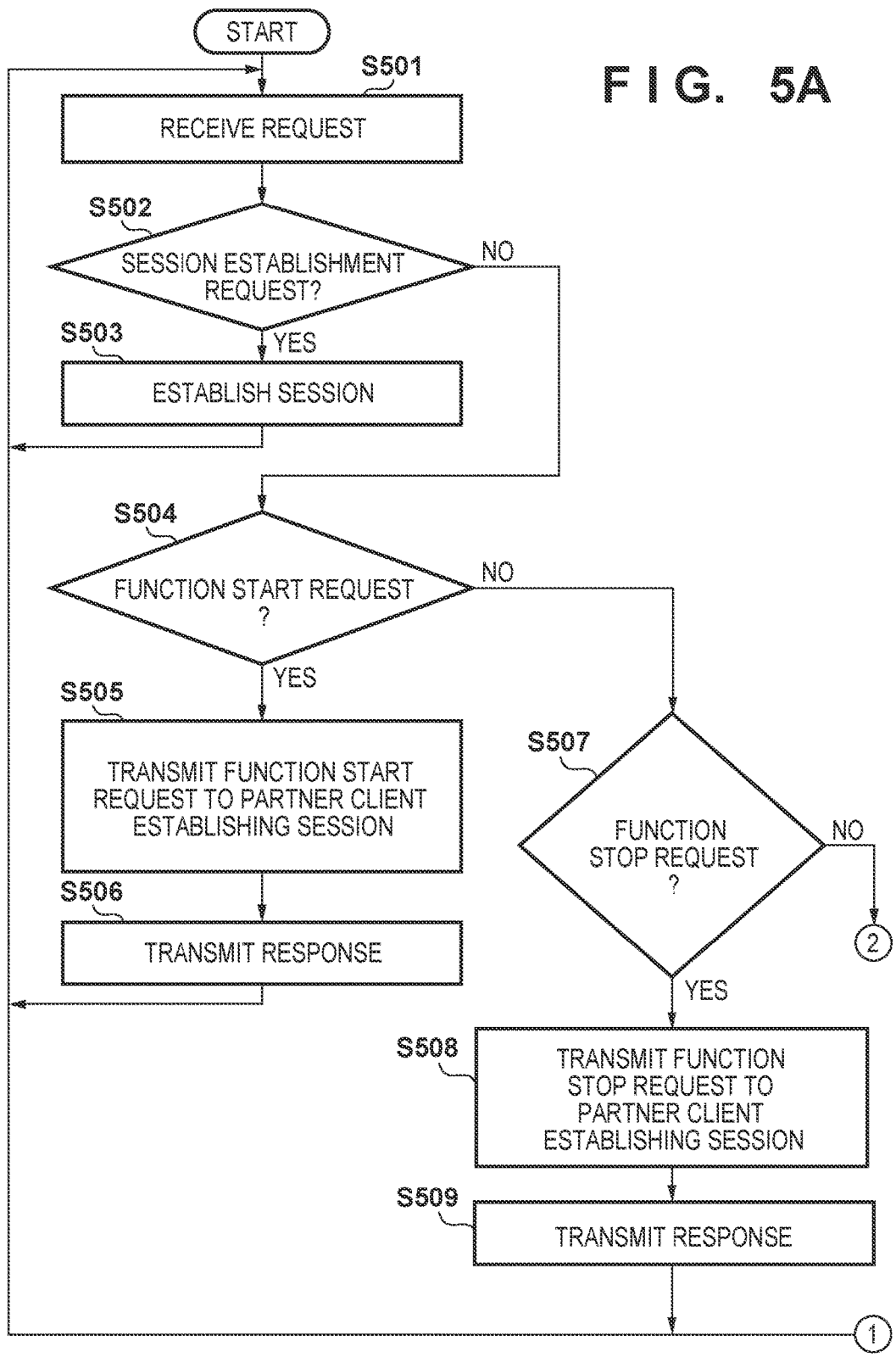

The processing sequence of the relay server 103 according to this embodiment will be described next with reference to FIGS. 5A and 5B. This flowchart is implemented by loading the programs stored in, for example, the HDD 244 into the RAM 243 and executed by the CPU 241. The processing to be described below is performed in the transfer processing unit 271 of the relay server 103 in FIG. 2B.

When this processing is started, first, in step S501, the transfer processing unit 271 of the relay server 103 first receives data from clients. The clients here refer to the image forming apparatus 101 and the operator PC 102. Upon receiving the data, the transfer processing unit 271 determines in each of steps S502, S504, S507, S510, and S515 a specific request corresponding to the received data. If the transfer processing unit 271 cannot determine the request, the process returns to step S501 in which it receives next data. More specifically, the transfer processing unit 271 determines in step S502 whether the received data is a session establishment request. In step S504, the transfer processing unit 271 determines whether the received data is a function start request. In step S507, the transfer processing unit 271 determines whether the received, data is a function, stop request. In step S510, the transfer processing unit 271 determines whether the received data is a POST request for transfer. In step S515, the transfer processing unit 271 determines whether the received data is a GET request for transfer.

If the transfer processing unit 271 determines in step S502 that the received data is the session establishment request, the process advances to step S503 in which it executes session establishment processing for paring the image forming apparatus 101 and the operator PC 102, and returns the process to step S501. As described above, a description of a detailed establishment method will be omitted.

If the transfer processing unit 271 determines in step S504 that the received data is the function start request, the process advances to step S505 in which it transmits the function start request to a partner client which establishes a session with a source client. More specifically, the transfer processing unit 271 sets data "application name: function name" and "command: start" to the HTTP body part of a GET response, and transmits them to the partner client. In this embodiment, the transfer processing unit 271 receives the VNC start request from the operator PC 102 and transmits the VNC start request to the image forming apparatus 101. Upon completion of the process in step S505, the process advances to step S506 in which the transfer processing unit 271 transmits an HTTP response to the source client and returns the process to step S501.

If the transfer processing unit 271 determines in step S507 that the received data, is the function stop request, the process advances to step S508 in which it transmits the function stop request to the partner client which establishes the session with the source client. More specifically, the transfer processing unit 271 sets data "application name: function name" and "command: stop" to the HTTP body part of the GET response, and transmits them to the partner client. In this embodiment, the transfer processing unit 271 receives the VNC stop request from the operator PC 102 and transmits the VNC stop request to the image forming apparatus 101. Upon completion of the process in step S508, the process advances to step S509 in which the transfer processing unit 271 transmits an HTTP response to the source client and returns the process to step S501.

If the transfer processing unit 271 determines in step S510 that the received data is the POST request to transfer remote operation data, the process advances to step S511 in which it reads data from the HTTP body part of the received HTTP POST request. More specifically, the transfer processing unit 271 reads a part following "Data=" of the HTTP body part. Subsequently, in step S512, the transfer processing unit 271 obtains a connection destination port number from the HTTP body part of the POST request. More specifically, the transfer processing unit 271 reads a part following "Port" of the HTTP body part. Upon completion of reading in steps S511 and S512, the process advances to step S513 in which the transfer processing unit 271 pushes the data read in step S511 and information on the connection destination port number read in step S512 as a set with respect to a queue linked to a source client of this POST request. A queue exists for each request source. Data posted by the image forming apparatus 101 is pushed to a queue for the image forming apparatus 101, and data posted by the operator PC 102 is pushed to a queue for the operator PC 102. Upon completion of push, the process advances to step S514 in which the transfer processing unit 271 transmits a POST response to the source client and returns the process to step S501.

If the transfer processing unit 271 determines in step S515 that the received data is the GET request to transfer the remote operation data, the process advances to step S516 in which it pops data from a queue for the partner client which establishes a session with the source client. The transfer processing unit 271 pops data from the queue for the operator PC 102 for the GET request of the image forming apparatus 101 and pops data from the queue for the image forming apparatus 101 for the GET request of the operator PC 102. Upon completion of pop, in step S517, the transfer processing unit 271 creates an HTTP GET response to be transmitted to the source client and designates the connection destination port number popped from the queue to the HTTP body part. More specifically, the transfer processing unit 271 describes "Port=XXX (popped connection destination port number)" in the HTTP body part. Subsequently, in step S518, the transfer processing unit 271 sets the popped data to the HTTP body part of the GET response. More specifically, the transfer processing unit 271 describes "Data=XXX (read binary data)". Upon completion of the HTTP GET response in steps S517 and S518, the process advances to step S519 in which the transfer processing unit 271 transmits the GET response to the source client and returns the process to step S501.

As described above, the information processing system according to this embodiment is a remote support system that performs communication between the image forming apparatus and the information processing apparatus (operator PC) via the relay server. This information processing apparatus includes a plurality of communication clients respectively capable of communicating by different communication protocols. In addition, this information processing apparatus sets a local host as a connection destination, creates a communication socket (the first communication socket) by designating a predetermined port, and activates one communication client out of the plurality of communication clients. Furthermore, in communication between the activated communication client and the relay server, this information processing apparatus adjusts and relays communication data between HTTP and the corresponding communication protocol via the created communication socket. On the other hand, this image forming apparatus includes a plurality of communication servers respectively capable of communicating by different communication protocols. In addition, this image forming apparatus sets a local host as a connection destination and creates the second communication socket to one communication server out of the plurality of communication servers by designating a predetermined port designated from the information processing apparatus. Furthermore, in communication between the communication server and the relay server, this image forming apparatus adjusts and relays communication data between HTTP and the corresponding communication protocol via the communication socket (second communication socket). According to this embodiment, this eliminates a need to provide transfer processing for each communication function when there is an originally available communication function other than remote maintenance such as VNC between the operator PC 102 and the image forming apparatus 101. It is therefore possible to transfer communication data by a generic method and reduce a development cost or the like. Since an application need not be held for each communication function, it is also possible to use a memory resource in each apparatus effectively.

Second Embodiment

The second embodiment of the present invention will be described below. In this embodiment, a mechanism for transferring communication data by a generic method as in the above-described first embodiment also in a communication function of using a plurality of ports while switching them such as WEB communication will be described. The network arrangement, hardware arrangement, and software arrangement of this embodiment are the same as in the above-described first embodiment, and thus a description thereof will be omitted. The operation sequence of an overall system of this embodiment is also the same as in the above-described first embodiment, and thus a description thereof will be omitted. In this embodiment, a description will be given by using a WEB operation as an example of a remote operation. The WEB operation refers to performing an operation on the WEB server function of an image forming apparatus 101 by a WEB browser of an operator PC 102. More detailed processes of the image forming apparatus 101, the operator PC 102, and a relay server 103 will be described below.

<Processing Sequence of Operator PC>

Figure 6A:
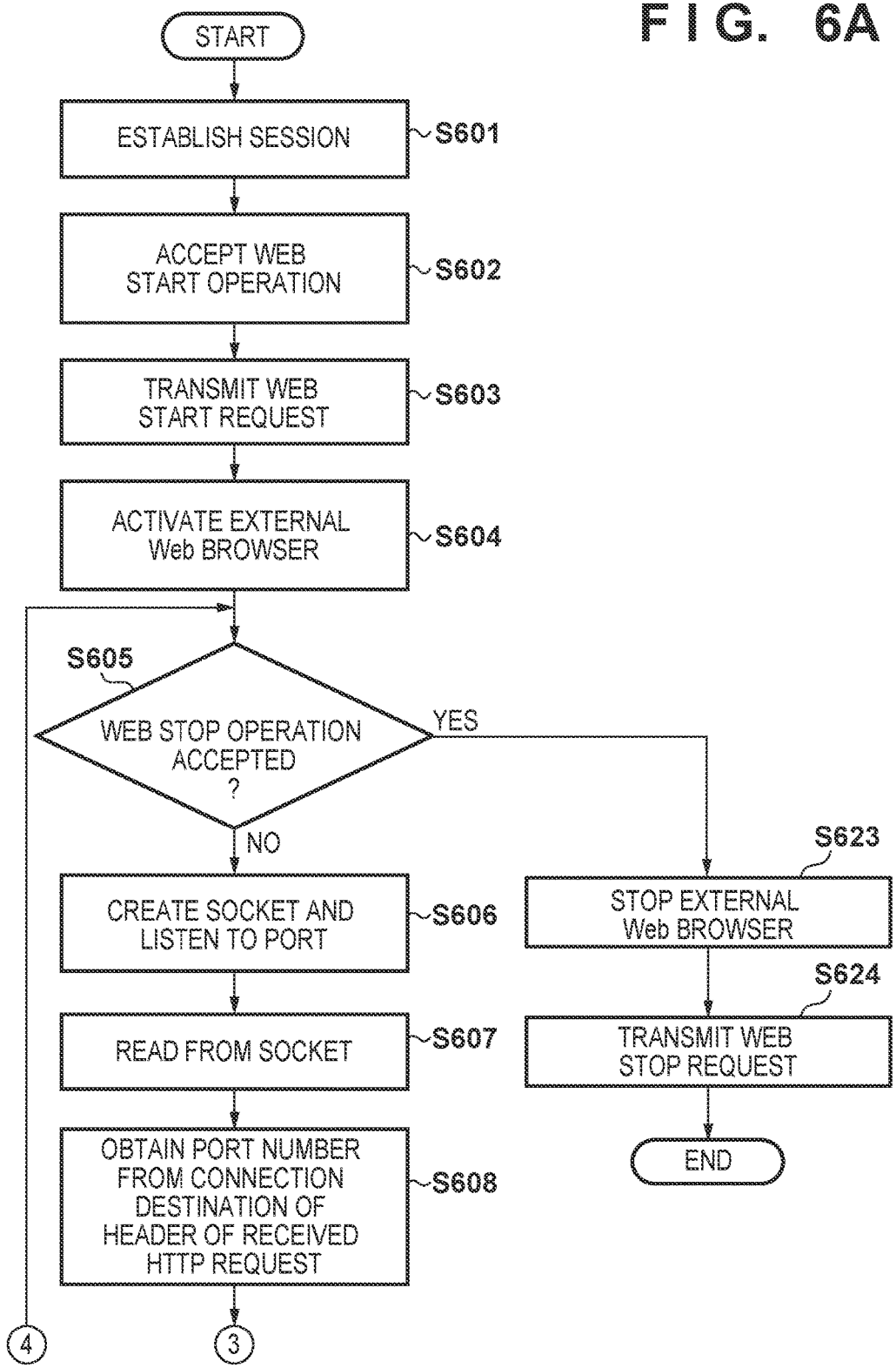
FIGS. 6A and 6B are a flowchart showing the process of an operator PC according to an embodiment.
Figure 6B:
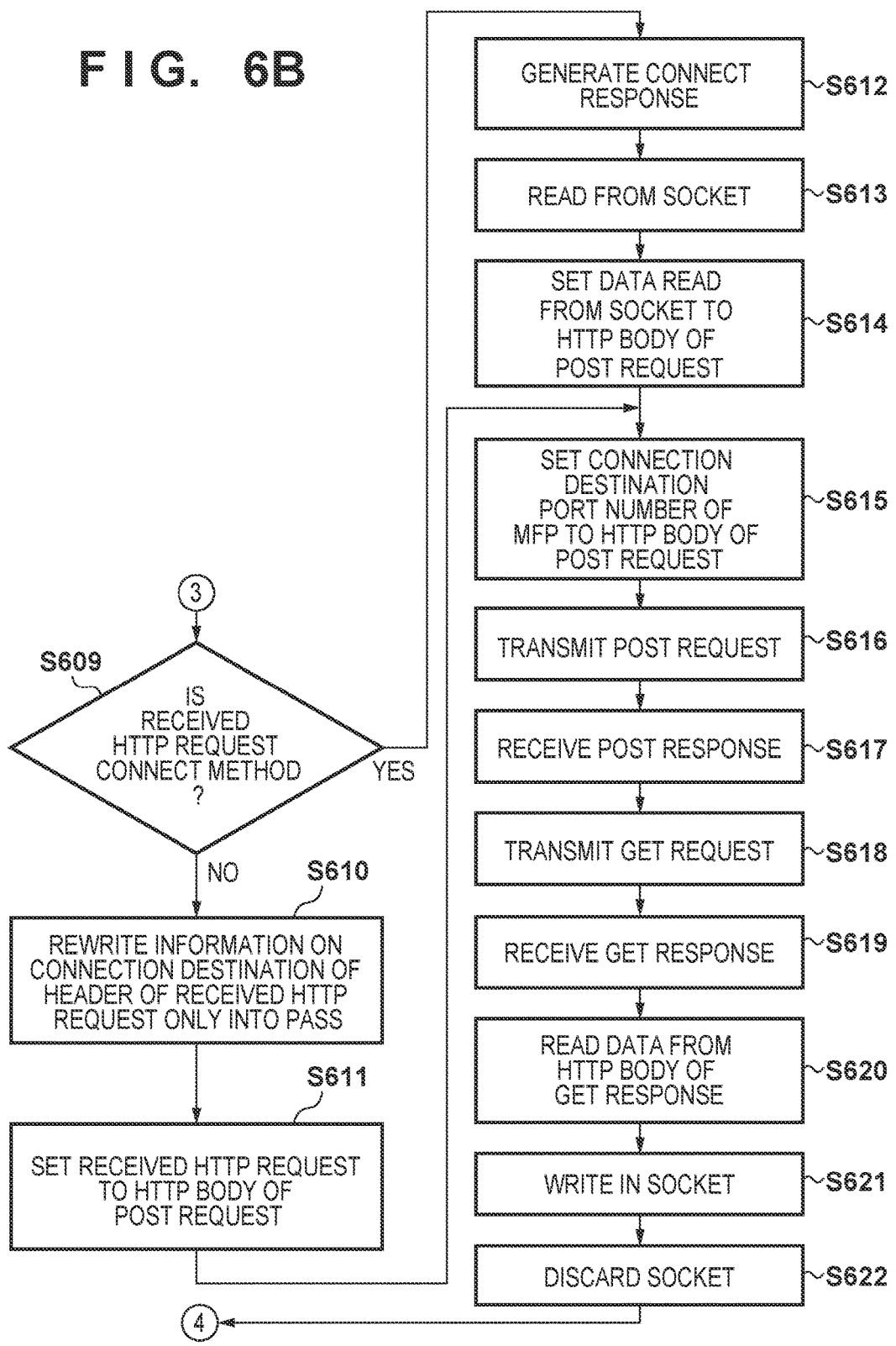

The processing sequence of the operator PC 102 according to this embodiment will be described with reference to FIGS. 6A and 6B, This flowchart is implemented by loading programs stored in, for example, an HDD 224 into a RAH 233 and executed by a (P The processing to be described below is performed by a relay server communication processing unit 265 of the operator PC 102 shown in FIG. 2B.

When this processing is started, first, in step S601, the relay server communication processing unit 265 of the operator PC 102 accesses the relay server 103 and establishes a session with the image forming apparatus 101 that performs remote maintenance. As described above, a description of a detailed establishment method will be omitted. Subsequently, in step S602, the relay server communication processing unit 265 accepts a WEB start operation. More specifically, the relay server communication processing unit 265 displays a start button on the screen of the operator PC 102 and accepts a click operation with a mouse pointer. Upon accepting the WEB start operation, the process advances to step S603 in which the relay server communication processing unit 265 transmits a WEB start request to the relay server 103. More specifically, the relay server communication processing unit 265 writes data "application name: WEB" and "command: start" in an HTTP body part, and posts a request to the relay server 103.

Then, in step S604, the relay server communication processing unit 265 activates the WEB browser. When activating the WEB browser, the relay server communication processing unit 265 sets an IP address to "127.0.0.1" as a proxy server setting of the WEB browser and designates a port number as "10000", activating the WEB browser. The port number designated here is set in the operator PC 102 in advance. In this embodiment, a description will be given assuming that a port number is 10000.

When the WEB browser is activated, the process advances to step S605 in which the relay server communication processing unit 265 determines whether a WEB stop operation is accepted. If the WEB stop operation is accepted, the process advances to end processing from step S623. On the other hand, if the WEB stop operation is not accepted, the process advances to step S606 in which the relay server communication processing unit 265 first creates a socket and starts to listen (listening state) in a port designated in step S604. The listening state is as described in the first embodiment above. This port is a port connected by an external WEB browser as a proxy server. After the relay server communication processing unit 265 starts to listen in the port, in step S607, it reads data from the socket. In step S607, the relay server communication processing unit 265 can receive data transmitted from the WEB browser.

In general, the WEB browser setting the proxy server can be connected, to the connection destination of the proxy server even if it accesses a URL different from the port waited in step S606 such as "http://xxx:8000/yyy/zzz". Also, in general, the WEB browser setting the proxy server communicates by using an HTTP header or an HTTP method different from that in a case in which it does not set the proxy server. A detail will be described later.

When data is received, the process advances to step S608 in which the relay server communication processing unit 265 obtains a connection destination port number to a WEB server of the image forming apparatus 101 from a received HTTP request of the WEB browser. More specifically, information "GET http://xxx:8000/yyy/zzz HTTP/1.1" is described in the header of the HTTP request received from the WEB browser. A port number "8000" is read and obtained from a URL part of this header. If a port number portion is omitted in the URL, a default value 80 for HTTP or a default value 443 for HTTPS is taken. In a general WEB browser, a description "GET /yyy/zzz HTTP/1.1" is obtained if the proxy server is not set.

Then, in step S609, the relay server communication processing unit 265 analyzes the HTTP method from the received HTTP request of the WEB browser and determines whether it is a CONNECT method. More specifically, the start part of the description "GET http://xxx:8000/yyy/zzz HTTP/1.1" of the header of the HTTP request received from the WEB browser is the HTTP method. If it is determined in step S609 that the HTTP method is not the CONNECT method, in step S610, the relay server communication processing unit 265 executes rewrite processing of the header of the HTTP request received from the WEB browser in step S607. More specifically, the relay server communication processing unit 265 rewrites "GET http://xxx:8000/yyy/zzz HTTP/1.1" into "GET /yyy/zzz HTTP/1.1" and changes it to an HTTP header format without going through the proxy server.

Then, in step S611, the relay server communication processing unit 265 creates an HTTP POST request to be transmitted to the relay server 103 and writes the HTTP request of the WEB browser processed in step S610 in its HTTP body part. More specifically, the relay server communication, processing unit 265 describes "Data=XXX (the HTTP request of the WEB browser processed in step S610)". After that, the process advances to step S615.

On the other hand, if it is determined in step S609 that the HTTP method is the CONNECT method, the process advances to step S612 in which the relay server communication processing unit 265 generates an HTTP CONNECT response and writes it in the socket generated in step S606. The CONNECT method is a method used when HTTPS communication is performed via the prosy server. Therefore, after the CONNECT response is returned, the WEB browser writes information to communicate with a WEB server that includes handshake of SSL communication in the socket. In order to read this, in step S613, the relay server communication processing unit 265 reads data from the socket created in step S606.

Then, in step S614, the relay server communication processing unit 265 creates an HTTP POST request to be transmitted to the relay server 103 and writes the data read in step S613 in its HTTP body part. More specifically, the relay server communication processing unit 265 describes "Data=XXX (the data read in step S613)". After that, the process advances to step S615.

After the process of step S611 or S614, in step S615, the relay server communication processing unit 265 designates the port number obtained in step S608 to the HTTP body part of the HTTP POST request to be transmitted to the relay server 103. More specifically, the relay server communication processing unit 265 describes "Port=3000" in the HTTP body part. Upon completion of the HTTP POST request in each of steps S611, S614, and S615, the process advances to step S616 in which the relay server communication processing unit 265 transmits an HTTP POST request to the relay server 103 and receives a POST response in step S617.

Then, the relay server communication processing unit 265 transmits an HTTP GET request to the relay server 103 in step S618 and receives a GET response in step S619. Upon completion of a reception, the process advances to step S620 in which the relay server communication processing unit 265 reads data from the HTTP body part of the GET response. More specifically, the relay server communication processing unit 265 reads a part following "Data=" of the HTTP body part. The data read in step S620 is data transmitted by the WEB server of the image forming apparatus 101.

Upon completion of reading of the data, the process advances to step S621 in which the relay server communication processing unit 265 writes the read data in the socket created in step S606. Then, in step S622, the relay server communication processing unit 265 discards the socket created in step S606. The relay server communication processing unit 265 repeats processes from steps S606 to S622 until the WEB stop operation in step S605 is accepted.

On the other hand, if the WEB stop operation is accepted in step S605, the process advances to step S623 in which the relay server communication processing unit 265 stops the WEB browser activated in step S604. Finally, in step S624, the relay server communication processing unit 265 transmits a WEB stop request to the relay server 103 and terminates the process. More specifically, the relay server communication processing unit 265 writes data "application name: WEB" and "command: stop" in the HTTP body part, and posts a request to the relay server 103.

<Processing Sequence of Image Forming Apparatus>

Figure 7:
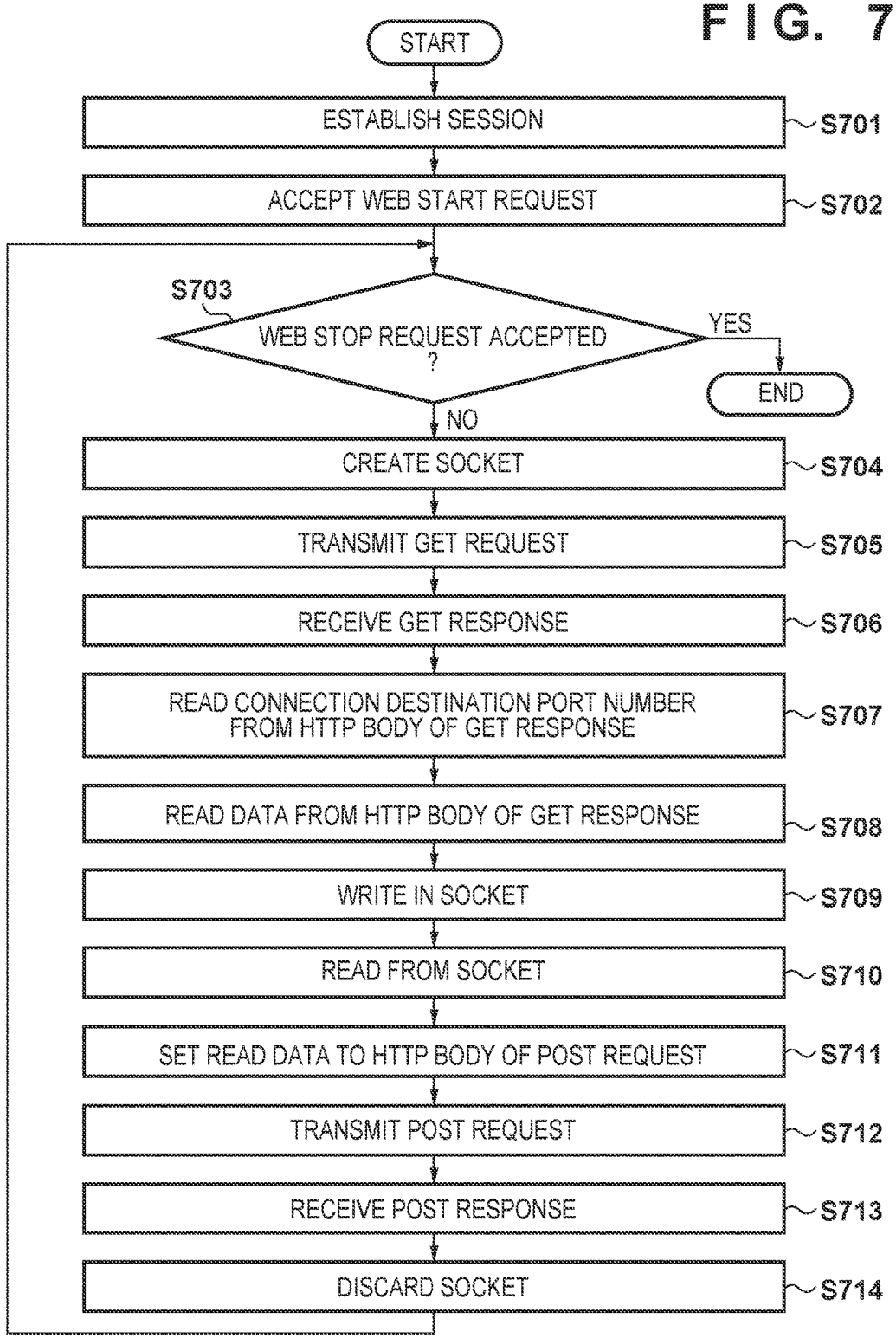
FIG. 7 is a flowchart showing the process of an image forming apparatus according to the embodiment.

The processing sequence of the image forming apparatus 101 according to this embodiment will be described next with reference to FIG. 7. Processing contents are the same as in the description of FIG. 4 in the first embodiment above, and thus a description thereof will be omitted. However, the processing contents are only different in that a function accepted in steps S702 and S703 is not VNC but WEB.

<Processing Sequence of Relay Server>

The processing sequence of the relay server 103 according to this embodiment will be described next. The processing sequence of the relay server 103 is the same as in the flowchart of FIGS. 5A and 5B in the first embodiment described above, and thus a description thereof will be omitted.

As described above, an information processing system according to this embodiment can also transfer communication data by the generic method in the communication function of using the plurality of ports while switching them such as WEB communication in place of the arrangement of the first embodiment described above. This makes it possible to solve a problem that all port numbers used by WEB communication need to be managed in advance in communication processing units of the image forming apparatus 101 and operator PC 102.

Third Embodiment

The third embodiment of the present invention will be described below. In this embodiment, a mechanism capable of performing a remote operation even if there is a screen redirected by a WEB server to an external host such as a case in which the WEB server redirects a login screen to an external authentication server will be described. The network arrangement, hardware arrangement; and software arrangement of this embodiment are the same as in the above-described first embodiment, and thus a description thereof will be omitted. The operation sequence of an overall system of this embodiment is also the same as in the above-described second embodiment, and thus a description thereof will be omitted. More detailed processes of an image forming apparatus 101, an operator PC 102, and a relay server 103 will be described below.

<Processing Sequence of Operator PC>

Figure 8A:
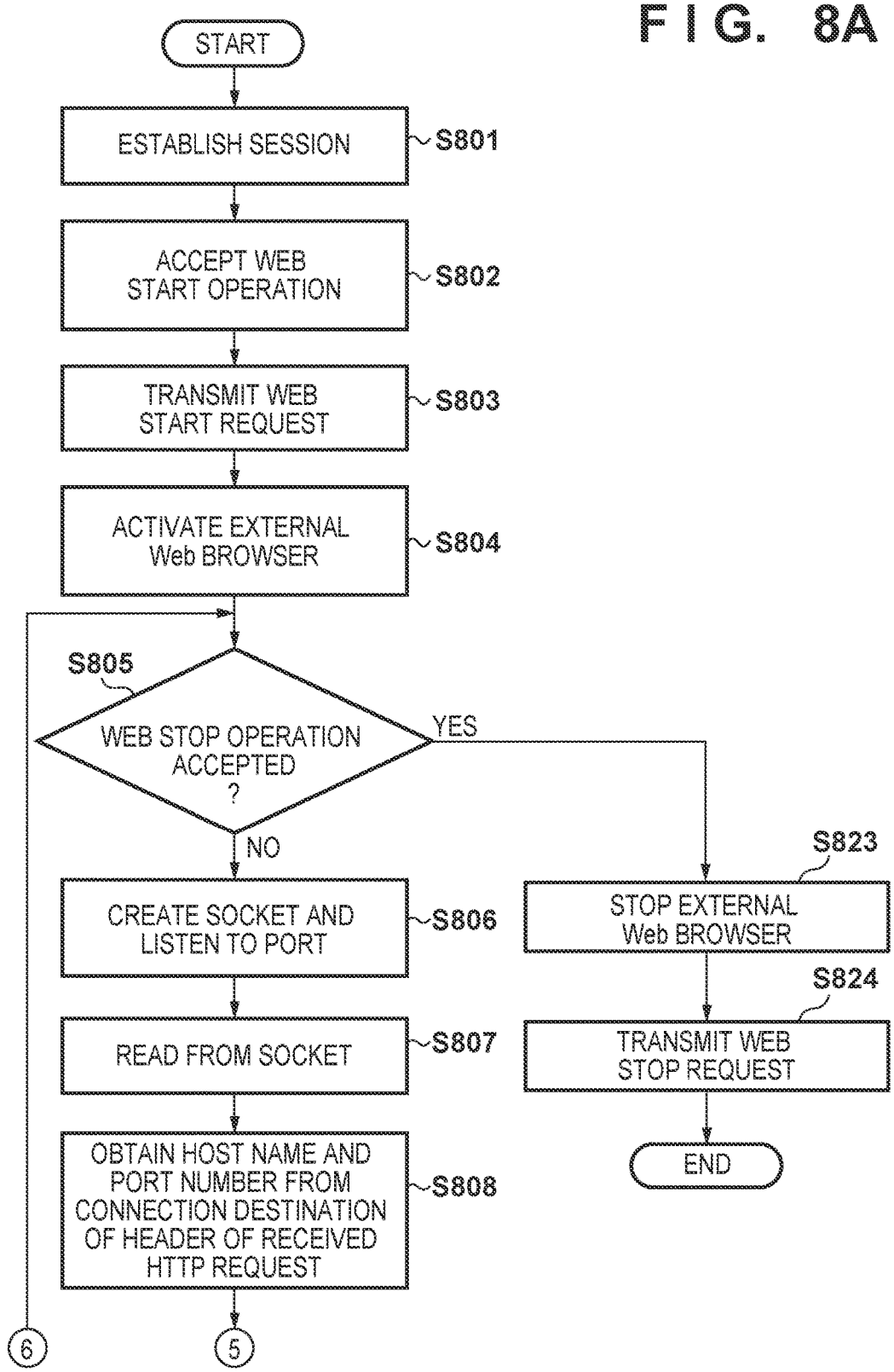
FIGS. 8A and 8B are a flowchart showing the process of an operator PC according to an embodiment.
Figure 8B:
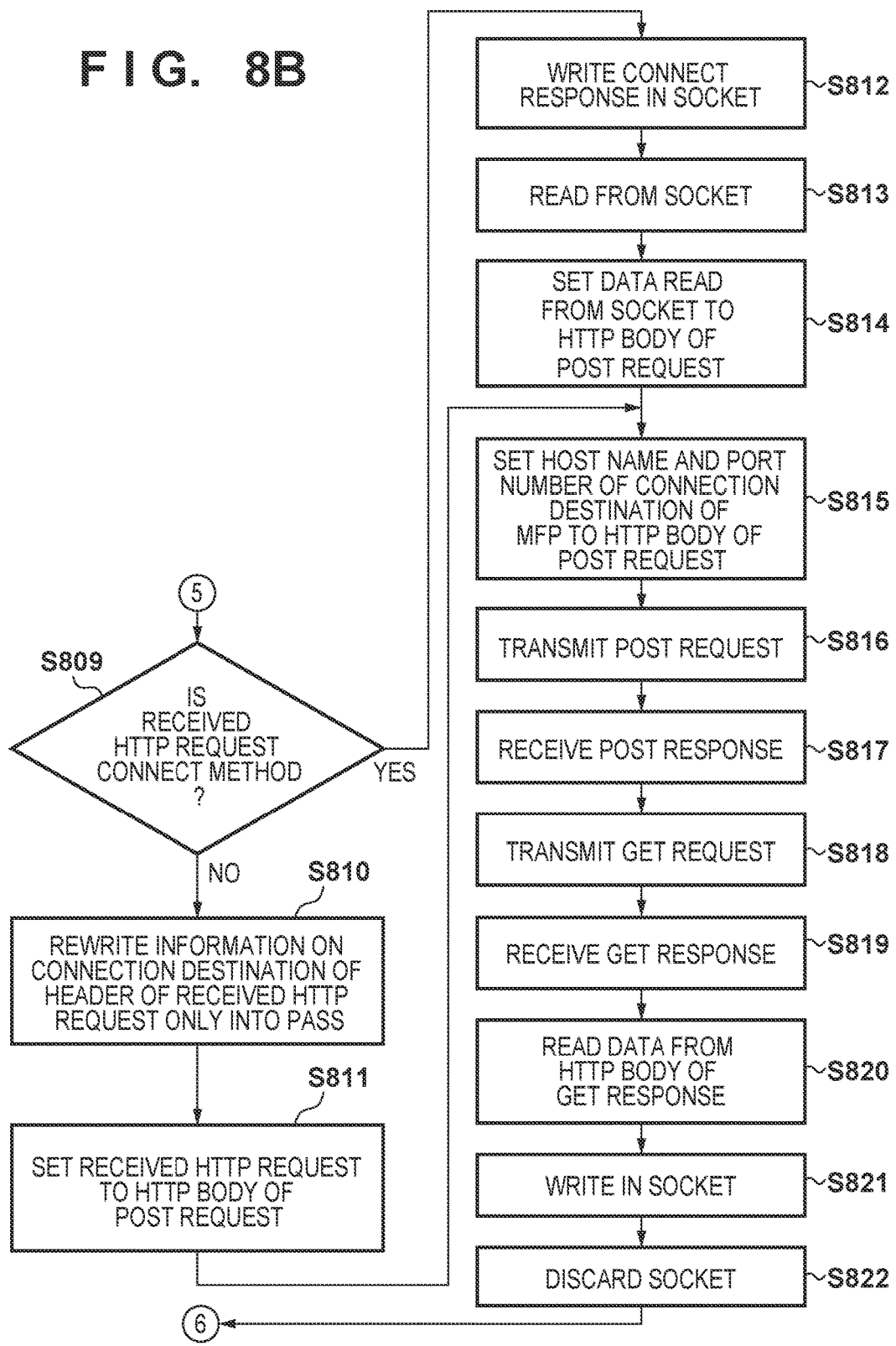

First, the processing sequence of the operator PC 102 according to this embodiment will, be described with reference to FIGS. 8A and 8B. This flowchart is implemented by loading programs stored in, for example, an HDD 224 into a RAM 223 and executed by a CPU 221. The processing to be described below is performed by a relay server communication processing unit 265 of the operator PC 102 shown in FIG. 2B. Most of processing contents are the same as the description of FIGS. 5A and 5B in the second embodiment above, and thus a repetitive description of processes will be omitted. That is, processes from steps S801 to S807 are the same as the processes from steps S601 to S607.

After step S807, the process advances to step S808 in which the relay server communication processing unit 265 obtains the host name and port number of a connection destination to the WEB server of the image forming apparatus 101 from a received HTTP request of the WEB browser. More specifically, information "GET http://xxx:8000/yyy/zzz HTTP/1.1" is described in the header of the HTTP request received from the WEB browser. The relay server communication processing unit 265 reads and obtains a value "xxx" as the host name and a value "8000" as the port number from a URL part of this header. If a port number portion is omitted in a URL, a default value 80 for HTTP or a default value 443 for HTTPS is taken.

Subsequent processes in steps S809 to S814 are the same as the processes in steps S609 to S614. After a process in step S811 or S814, the process advances to step S815 in which the relay server communication processing unit 265 designates the host name and port number obtained in step S808 to the HTTP body part of an HTTP POST request to be transmitted to the relay server 103. More specifically, the relay server communication processing unit 265 describes "Host=xxx" and "Port=8000" in the HTTP body part. Subsequent processes in steps S816 to S824 are the same as the processes in steps S616 to S624.

<Processing Sequence of Image Forming Apparatus>

Figure 9:
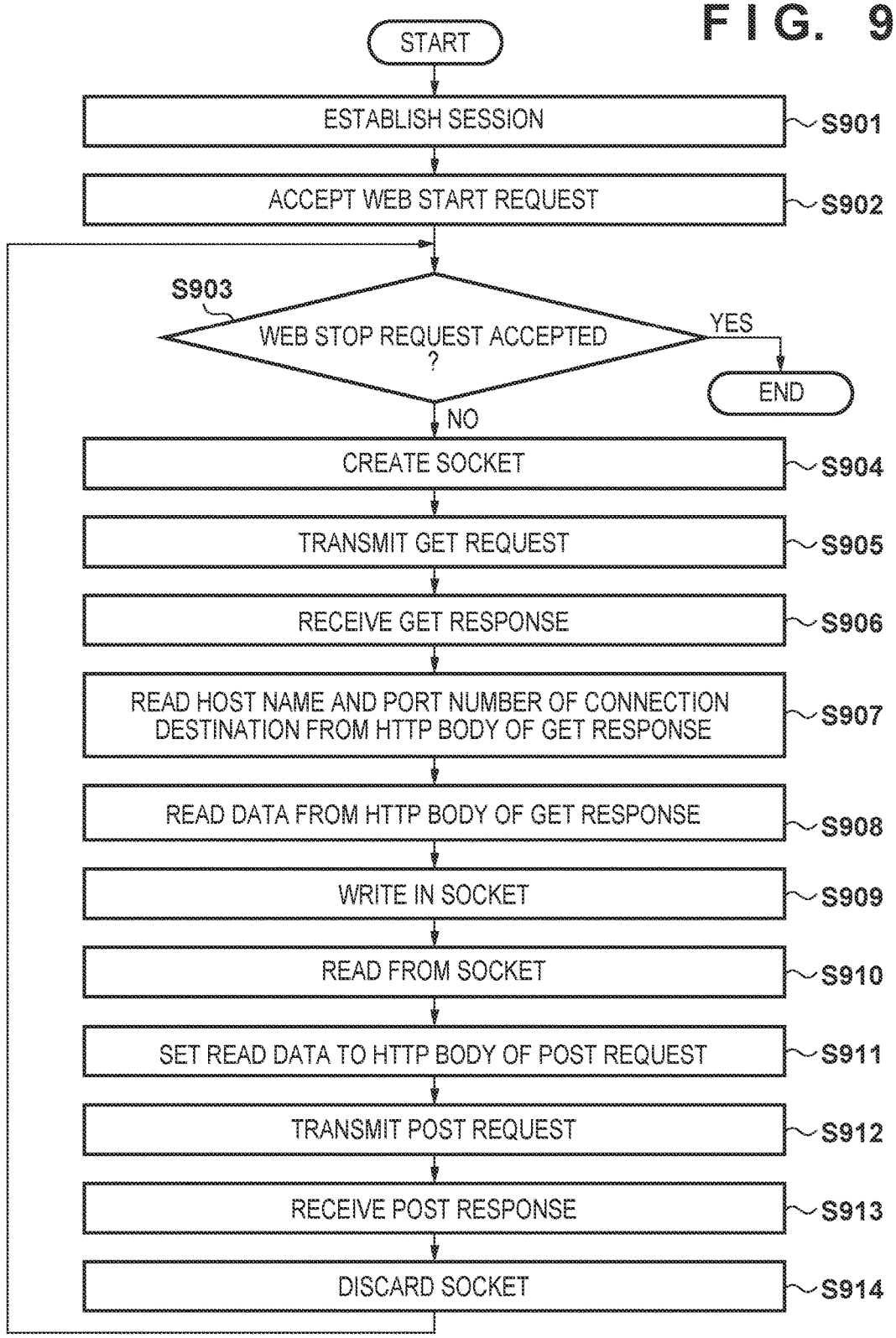
FIG. 9 is a flowchart showing the process of an image forming apparatus according to the embodiment.

The processing sequence of the image forming apparatus 101 according to this embodiment will be described next with reference to FIG. 9. This flowchart is implemented by loading programs stored in, for example, an HDD 205 into a RAM 204 and executed by a CPU 202. The processing to be described below is performed by a relay server communication processing unit 255 of the image forming apparatus 101 shown in FIG. 2B. Most of processing contents are the same as the description of FIGS. 6A and 6B in the second embodiment above, and thus a repetitive description of processes will be omitted. Processes from steps S901 to S906 are the same as the processes from steps S701 to S706.

After step S906, the process advances to step S907 in which the relay server communication processing unit 255 obtains the host name and port number of a connection destination from the HTTP body part of a GET response. More specifically, the relay server communication processing unit 255 reads parts following "Host=" and "Port=", respectively, of the HTTP body part. The next process in step S908 is the same as in step S708. After a process in step S908, the process advances to step S909 in which the relay server communication processing unit 255 designates the host name and port number obtained in step S907 as the connection destination host name and the connection destination port number, connects a socket, and writes the data read in step S908 in the socket. Subsequent processes in steps S910 to S914 are the same as the processes in steps S710 to S714.

<Processing Sequence of Relay Server>

Figure 10A:
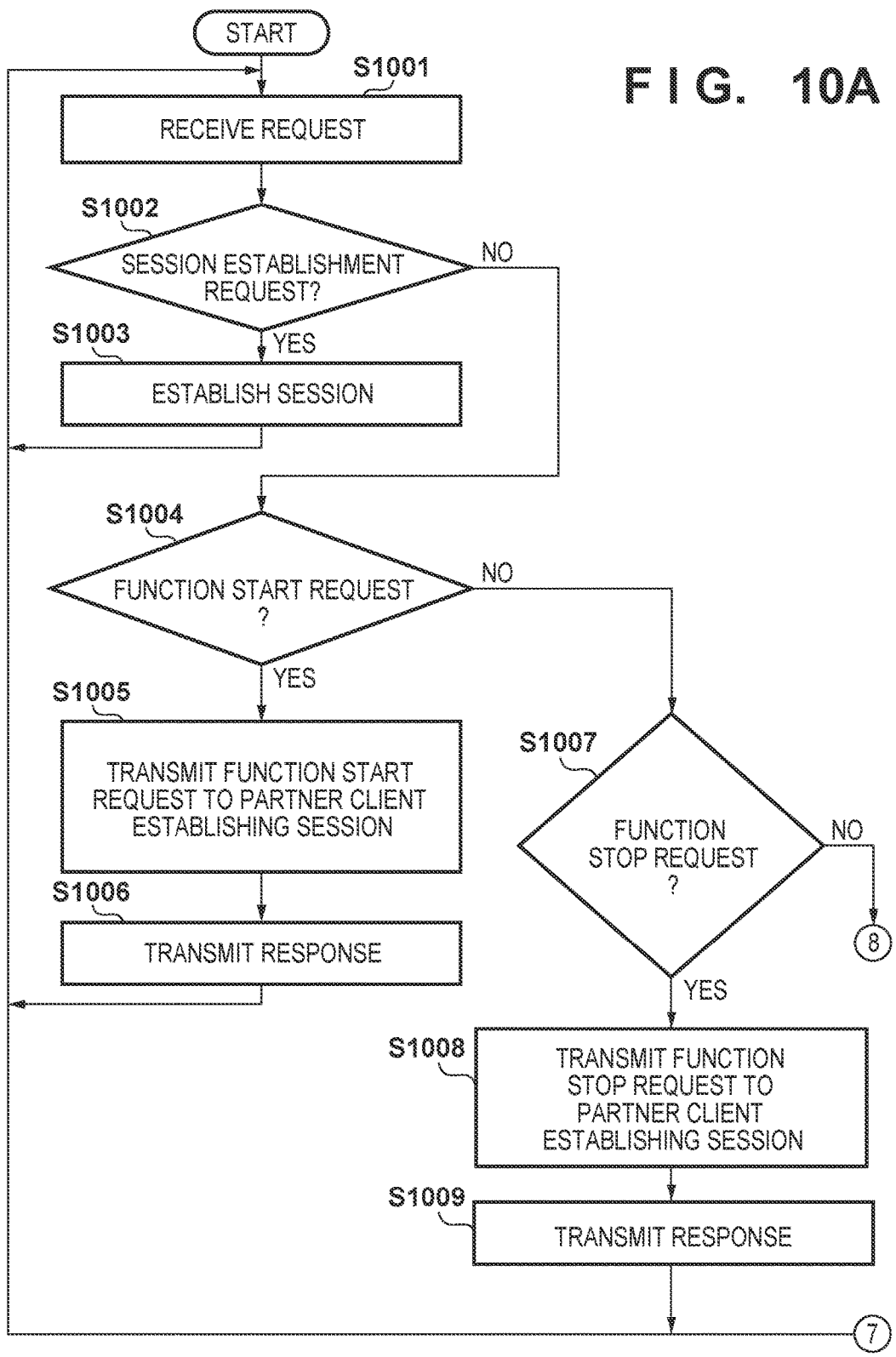
FIGS. 10A and 10B are a flowchart showing the process of a relay server according to the embodiment.
Figure 10B:
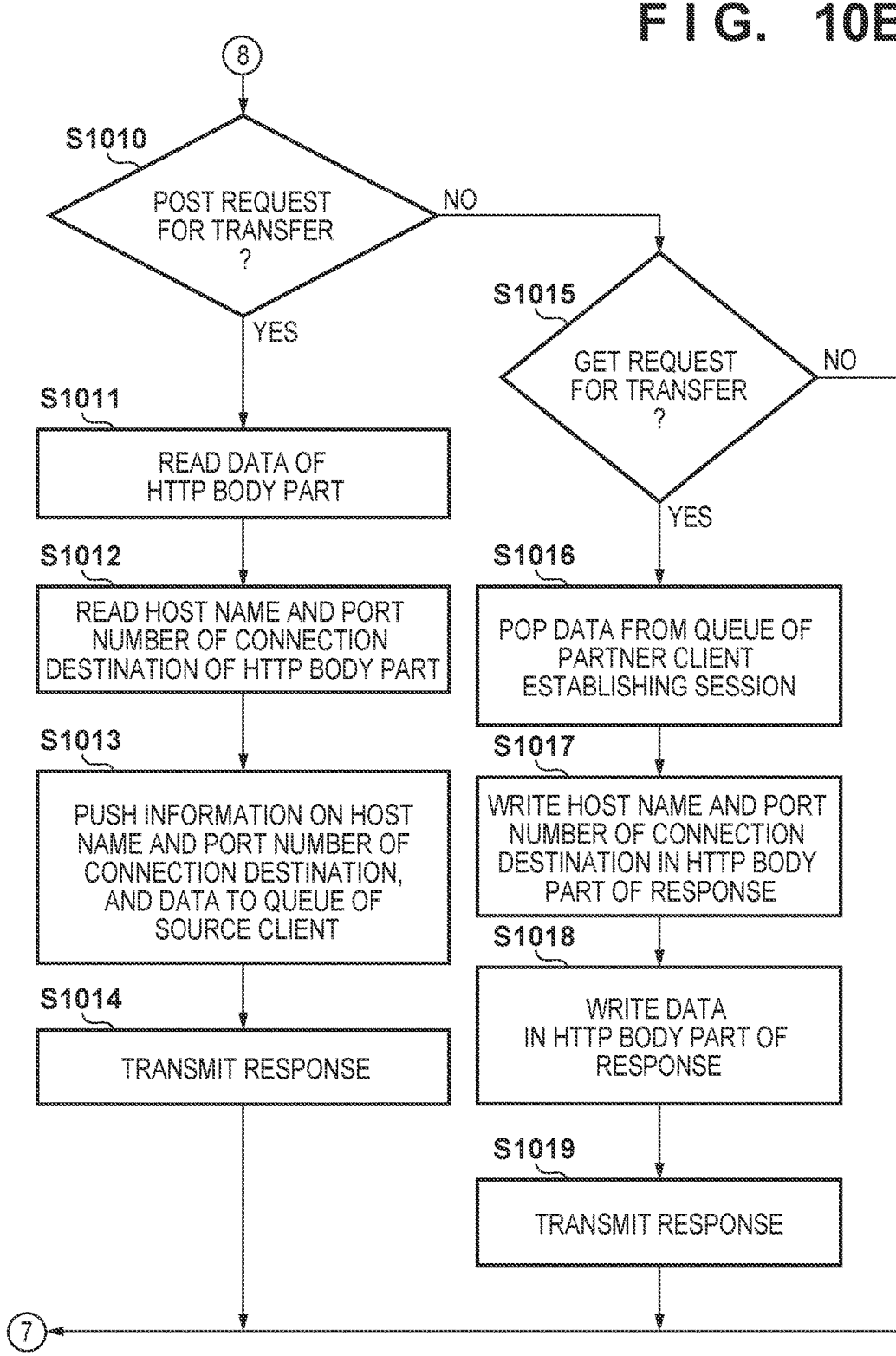

The processing sequence of the relay server 103 according to this embodiment will be described next with reference to FIGS. 10A and 10B. This flowchart is implemented by loading programs stored in, for example, an HDD 244 into a RAM 243 and executed by a CPU 241. The processing to be described below is performed in a transfer processing unit 271 of the relay server 103 shown in FIG. 2B. Most of processing contents are the same as the description of FIG. 4 in the first embodiment above, and thus a repetitive description of processes will be omitted. Processes from steps S1001 to S1011 are the same as the processes from steps S501 to S511.

After step S1011, the process advances to step S1012 in which the transfer processing unit 271 obtains the host name and port number of a connection destination from the HTTP body part of a POST request. More specifically, the transfer processing unit 271 reads parts following "Host=" and "Port=", respectively, of the HTTP body part. The subsequent processes in steps S1013 to S1016 are the same as in steps S513 to S516. After a process in step S1016, the process advances to step S1017 in which the transfer processing unit 271 creates an HTTP GET response to be transmitted to a source client, and designates the host name and port number of the connection destination popped from a queue to the HTTP body part. More specifically, the transfer processing unit 271 describes "Host=XXX (popped connection destination host name)" and "Port=XXX (popped connection destination port number)" in the HTTP body part. The subsequent processes in steps S1018 and S1019 are the same as in steps S518 and S519.

As described above, an information processing system according to this embodiment further designates the host name to an HTTP request in addition to the port number in the arrangement of the second embodiment described above. This makes it possible to perform a remote operation even if there is a screen redirected by a WEB server to an external host such as a case in which the WEB server of the image forming apparatus 101 redirects a login screen to an external authentication server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-002843 filed on Jan. 11, 2017, which is hereby incorporated by reference herein in its entirety.

What is claimed is:

1. An information processing system that performs communication between an image forming apparatus and an information processing apparatus via a relay server, the information processing apparatus comprising:

a plurality of communication clients respectively capable of communicating by different communication protocols; and a first communication control unit that sets a local host as a connection destination, creates a first communication socket by designating a predetermined port, activates one communication client out of the plurality of communication clients, and in communication between the activated communication client and the relay server, adjusts and relays communication data between HTTP and the corresponding communication protocol via the first communication socket, wherein at least one of the plurality of communication clients and the first communication control unit is implemented by at least one processor and a memory, and the image forming apparatus comprising:

a plurality of communication servers respectively capable of communicating by different communication protocols; and a second communication control unit that sets a local host as a connection destination, creates a second communication socket to one communication server out of the plurality of communication servers by designating a predetermined port designated from the information processing apparatus, and in communication between the communication server and the relay server, adjusts and relays communication data between HTTP and the corresponding communication protocol via the second communication socket, wherein at least one the plurality of communication servers and the second communication control unit is implemented by at least one processor and a memory.

2. The system according to claim 1, wherein upon receiving the communication data via the first communication socket, the first communication control unit sets a port number of a port for accessing a communication server of the image forming apparatus that serves as a server of the communication client that has transmitted the communication data and transmits the communication data as an HTTP request.

3. The system according to claim 2, wherein the information processing apparatus holds the port number of the port for accessing the communication server of the image forming apparatus in advance.

4. The system according to claim 1, wherein the first communication control unit and the second communication control unit respectively sets an IP address indicating the information processing apparatus and the image processing apparatus as the local host.

5. The system according to claim 4, wherein the IP address indicating the information processing apparatus or the image processing apparatus is a local loopback address.

6. The system according to claim 1, wherein the image forming apparatus, the information processing apparatus, and the relay server are connected via a firewall.

7. An information processing system that performs communication between an image forming apparatus and an information processing apparatus via a relay server, the information processing apparatus comprising:

a plurality of communication clients respectively capable of communicating by different communication protocols; and a first communication control unit that sets a local host as a proxy server, creates a first communication socket by designating a predetermined port, activates one communication client out of the plurality of communication clients, and in communication between the activated communication client and the relay server, adjusts and relays communication data between HTTP and the corresponding communication protocol via the first communication socket, wherein at least one of the plurality of communication clients and the first communication control unit is implemented by at least one processor and a memory, and the image forming apparatus comprising:

a plurality of communication servers respectively capable of communicating by different communication protocols; and a second communication control unit that sets a local host as a proxy server, creates a second communication socket to one communication server out of the plurality of communication servers by designating a predetermined port designated from the information processing apparatus, and in communication between the communication server and the relay server, adjusts and relays communication data between HTTP and the corresponding communication protocol via the second communication socket, wherein at least one the plurality of communication servers and the second communication control unit is implemented by at least one processor and a memory.

8. The system according to claim 7, wherein upon receiving the communication data via the first communication socket, the first communication control unit sets a port number of a port for accessing a communication server of the image forming apparatus that serves as a server of the communication client that has transmitted the communication data and transmits the communication data as an HTTP request without going through the proxy server.

9. The system according to claim 7, wherein upon receiving the communication data via the first communication socket, the first communication control unit sets a port number of a port for accessing a communication server of the image forming apparatus that serves as a server of the communication client that has transmitted the communication data by analyzing the received communication data and transmits the communication data as an HTTP request without going through the proxy server.

10. The system according to claim 8, wherein the first communication control unit sets the local host in addition to the port number and transmits the communication data as an HTTP request.

11. A method of controlling an information processing system that performs communication via a relay server between an image forming apparatus having a plurality of communication servers respectively capable of communicating by different communication protocols and an information processing apparatus having a plurality of communication clients respectively capable of communicating by different communication protocols, the method comprising:

controlling the information processing apparatus to:
set a first local host as a connection destination;
create a first communication socket by designating a predetermined port and activating one communication client out of the plurality of communication clients; and
in communication between the activated communication client and the relay server, adjust and relay communication data between HTTP and the corresponding communication protocol via the first communication socket; and controlling the image forming apparatus to:
set a second local host as a connection destination;
create a second communication socket to one communication server out of the plurality of communication servers by designating a predetermined port designated from the information processing apparatus; and in communication between the communication server and the relay server, adjust and relay communication data between HTTP and the corresponding communication protocol via the second communication socket.

12. A non-transitory computer-readable storage medium storing a computer program for causing a computer to execute a method of controlling an information processing system that performs communication via a relay server between an image forming apparatus having a plurality of communication servers respectively capable of communicating by different communication protocols and an information processing apparatus having a plurality of communication clients respectively capable of communicating by different communication protocols, the method comprising:

controlling the information processing apparatus to:

set a first local host as a connection destination;

create a first communication socket by designating a predetermined port and activating one communication client out of the plurality of communication clients; and in communication between the activated communication client and the relay server, adjust and relay communication data between HTTP and the corresponding communication protocol via the first communication socket; and controlling the image forming apparatus to:

set a second local host as a connection destination;

create a second communication socket to one communication server out of the plurality of communication servers by designating a predetermined port designated from the information processing apparatus; and in communication between the communication server and the relay server, adjust and relay communication data between HTTP and the corresponding communication protocol via the second communication socket.

13. A method of controlling an information processing system that performs communication via a relay server between an image forming apparatus having a plurality of communication servers respectively capable of communicating by different communication protocols and an information processing apparatus having a plurality of communication clients respectively capable of communicating by different communication protocols, the method comprising:

controlling the information processing apparatus to:

set a first local host as a proxy server;

create a first communication socket by designating a predetermined port and activating one communication client out of the plurality of communication clients; and in communication between the activated communication client and the relay server, adjust and relay communication data between HTTP and the corresponding communication protocol via the first communication socket; and controlling the image forming apparatus to:

set a second local host as a proxy server;

create a second communication socket to one communication server out of the plurality of communication servers by designating a predetermined port designated from the information processing apparatus; and in communication between the communication server and the relay server, adjust and relay communication data between HTTP and the corresponding communication protocol via the second communication socket.

14. A non-transitory computer-readable storage medium storing a computer program for causing a computer to execute a method of controlling an information processing system that performs communication via a relay server between an image forming apparatus having a plurality of communication servers respectively capable of communicating by different communication protocols and an information processing apparatus having a plurality of communication clients respectively capable of communicating by different communication protocols, the method comprising:

controlling the information processing apparatus to:

set a first local host as a proxy server;

create a first communication socket by designating a predetermined port and activating one communication client out of the plurality of communication clients; and in communication between the activated communication client and the relay server, adjust and relay communication data between HTTP and the corresponding communication protocol via the first communication socket; and controlling the image forming apparatus to:

set a second local host as a proxy server;

create a second communication socket to one communication server out of the plurality of communication servers by designating a predetermined port designated from the information processing apparatus; and in communication between the communication server and the relay server, adjust and relay communication data between HTTP and the corresponding communication protocol via the second communication socket.

* * * * *